United States Patent
Lee et al.

(10) Patent No.: US 10,341,280 B2
(45) Date of Patent: Jul. 2, 2019

(54) METHOD, SYSTEM, AND RECORDING MEDIUM FOR PROVIDING MESSAGE BASED ON GROUP UNIT

(71) Applicant: NAVER Corporation, Seongnam-si (KR)

(72) Inventors: YungSeong Lee, Seongnam-si (KR); Jeong Hwa Kim, Seongnam-si (KR); Hyo Jung Kim, Seongnam-si (KR); Hak Jin Doh, Seongnam-si (KR); Sun Young Park, Seongnam-si (KR); Myongwon Seo, Seongnam-si (KR); Chan Hyuk Sung, Seongnam-si (KR); Joseph Yeo, Seongnam-si (KR); Keonsu Lee, Seongnam-si (KR); Byoungseung Lee, Seongnam-si (KR); KyoHee Chang, Seongnam-si (KR); Hyeonji Jeon, Seongnam-si (KR); Munhyun Joo, Seongnam-si (KR); Kidoo Han, Seongnam-si (KR); Dohoon Kim, Seongnam-si (KR); Seong Woo Sim, Seongnam-si (KR)

(73) Assignee: NAVER Corporation, Seongnam-si (KR)

( * ) Notice: Subject to any disclaimer, the term of this patent is extended or adjusted under 35 U.S.C. 154(b) by 218 days.

(21) Appl. No.: 15/239,197

(22) Filed: Aug. 17, 2016

(65) Prior Publication Data
US 2017/0054668 A1 Feb. 23, 2017

(30) Foreign Application Priority Data
Aug. 18, 2015 (KR) ........................ 10-2015-0115989

(51) Int. Cl.
G06F 15/16 (2006.01)
H04L 12/58 (2006.01)
H04M 1/725 (2006.01)

(52) U.S. Cl.
CPC .............. *H04L 51/22* (2013.01); *H04L 51/12* (2013.01); *H04L 51/16* (2013.01); *H04M 1/72552* (2013.01)

(58) Field of Classification Search
CPC ......... H04L 51/22; H04L 51/16; H04L 51/12; H04M 1/72552
See application file for complete search history.

(56) References Cited

U.S. PATENT DOCUMENTS

| 8,797,906 B2 * | 8/2014 | Makhoul ................. H04L 51/38 370/252 |
| 2005/0114508 A1 * | 5/2005 | DeStefano .......... G06F 17/2705 709/224 |
| 2006/0004622 A1 * | 1/2006 | Fanelli ................... G06Q 30/02 705/7.32 |
| 2006/0123091 A1 * | 6/2006 | Ho ....................... G06Q 10/107 709/206 |

(Continued)

FOREIGN PATENT DOCUMENTS

| JP | 2002-328983 A | 11/2002 |
| JP | 2014-529152 A | 10/2014 |
| JP | 52014529152- 20151001 | 10/2014 |

OTHER PUBLICATIONS

Japanese Office Action dated Jun. 13, 2017 by the Japanese Patent Office corresponding to Japanese patent application No. 2016-139544.

(Continued)

*Primary Examiner* — Richard G Keehn
(74) *Attorney, Agent, or Firm* — Greer Burns & Crain, Ltd.

(57) ABSTRACT

Provided are a method, system, and non-transitory computer-readable recording medium for providing a message based on a group unit. A message providing method includes classifying a message received at a user terminal into a predefined group; creating a representative item of the group using a message included in the group; and providing message items through a message list in message box that includes the message received at the user terminal by including the representative item as an item associated with the group and by grouping messages included in the group in the message list.

19 Claims, 20 Drawing Sheets

(56) References Cited

U.S. PATENT DOCUMENTS

| | | | | |
|---|---|---|---|---|
| 2006/0128404 A1* | 6/2006 | Klassen | ................. | H04L 51/16 |
| | | | | 455/466 |
| 2008/0091785 A1* | 4/2008 | Pulfer | ................. | G06Q 10/107 |
| | | | | 709/206 |
| 2010/0159967 A1* | 6/2010 | Pounds | ................. | H04L 51/14 |
| | | | | 709/206 |
| 2011/0154474 A1* | 6/2011 | Siegel | ................. | H04L 51/14 |
| | | | | 726/12 |
| 2013/0007648 A1* | 1/2013 | Gamon | ................. | G06Q 10/107 |
| | | | | 715/771 |
| 2013/0054702 A1* | 2/2013 | Belchee | ................. | G06F 21/10 |
| | | | | 709/206 |
| 2013/0097279 A1* | 4/2013 | Polis | ................. | H04L 51/12 |
| | | | | 709/217 |
| 2013/0218896 A1* | 8/2013 | Palay | ................. | H04L 51/16 |
| | | | | 707/741 |
| 2013/0268839 A1 | 10/2013 | Lefebvre et al. | | |
| 2014/0279996 A1* | 9/2014 | Teevan | ................. | G06F 16/38 |
| | | | | 707/706 |

OTHER PUBLICATIONS

Japanese Office Action dated Jan. 30, 2018 by the Japanese Patent Office corresponding to Japanese patent application No. 2016-139544.

Paradise Life using Gmail, Yomiuri PC, vol. 12, No. 9, Japan, Yomiuri Newspaper Tokyo Headquarter, Sep. 1, 2007. vol. 12, pp. 24-25.

Perfect analysis of Google, Mr. PC, vol. 6, No. 4, Japan, Yomiuri Newspaper Tokyo Headquarter, Shinyu-sya Corp., Feb. 24, 2015. vol. 6, pp. 28-35.

* cited by examiner

METHOD, SYSTEM, AND RECORDING MEDIUM FOR PROVIDING MESSAGE BASED ON GROUP UNIT

CROSS-REFERENCE TO RELATED APPLICATION(S)

This application claims priority under 35 U.S.C. § 119 to Korean Patent Application No. 10-2015-0115989 filed on Aug. 18, 2015, in the Korean Intellectual Property Office (KIPO), the entire contents of which are incorporated herein by reference.

BACKGROUND

Field

One or more example embodiments of the present invention relate to technology for providing a message.

Description of Related Art

A messaging application that enables users to receive and send messages has become an essential configuration element at a terminal. For example, a short message service (SMS), a multimedia messaging service (MMS), and the like, are generally used to send and receive text messages and/or video messages between terminals.

In general, messages are managed based on a collective criterion regardless of considering a sender or other information. For example, messages are saved and displayed in order from latest to oldest based on times at which the messages are received.

Such a message saving method may cause inconveniences such that a user needs to verify each of messages in sequential order in which the messages are saved in order to search again for a specific message, or to perform management, such as delete, resend, etc.

SUMMARY

One or more example embodiments provide a message providing method, system, and non-transitory computer-readable recording medium that may provide messages grouped based on message content.

One or more example embodiments also provide a message providing method, system, and non-transitory computer-readable recording medium that may group messages included in a group using an item capable of representing the group and may provide the grouped messages.

According to an aspect of one or more example embodiments, there is provided a message providing method implemented in a computer, the method including classifying a message received at a user terminal for each group; creating a representative item of a group using a message included in each group; and providing a message item through a message list of a message box that includes the message to the user terminal by including the representative item as an item associated with the group and by grouping messages included in the group in the message list.

A plurality of groups used for classifying the message may be predefined, and the classifying may include determining a group corresponding to the message among the plurality of groups based on message content parsed from the message.

The plurality of groups may include at least one of a group for managing an authentication related message, a group for managing a delivery related message, a group for managing a card payment message, a group for managing a banking transaction message, a group for managing a smishing message, and a manage for managing an advertising message.

The creating may include creating the representative item using at least one of an undeleted message, an unread message, and a message received during a unit period, among messages included in each group, and a user interface for providing accumulated information or statistical information associated with messages of each group.

In the case of a group for managing an authentication related message, the creating may include creating the representative item using at least one of an undeleted message and an unread message among messages included in the group.

In the case of a group for managing a delivery related message, the creating may include creating the representative item using a message received during a unit period among messages included in the group.

In the case of a group for managing a financial transaction related message, the creating may include creating the representative item using a user interface for providing accumulated information or statistical information associated with messages of the group.

The providing may include displaying the representative item on the message list.

In the case of a group for managing an authentication related message, the providing may include providing at least one of a function of deleting all of messages included in a group in response to a selection on the group from the message list, a function of selecting and deleting at least a portion of the messages included in the group, a function of automatically deleting a message that satisfies a desired condition among the messages included in the group.

In the case of a group for managing a delivery related message, the providing may include providing a function of providing a delivery shipment history and a delivery tracking status referred with an originating number of a message included in the group in response to a selection on the group from the message list.

In the case of a group for managing a financial transaction related message, the providing may include providing at least one of a function of providing statistical information about transactions of all of financial companies and a function of providing statistical information about transactions of individual financial companies.

In the case of a group for managing an advertising message, the providing may include providing at least one of a function of blocking or deleting all of messages included in the group in response to a selection on the group from the message list and a function of selecting at least a portion of the messages included in the group and blocking or deleting the selected messages.

The providing may include processing at least a portion of information displayed through the reprehensive item to be hidden or to be highlighted.

According to an aspect of one or more example embodiments, there is provided a non-transitory computer-readable recording medium storing a computer program to implement a method including classifying a message received at a user terminal for each group; creating a representative item of a group using a message included in each group; and providing a message item through a message list of a message box that includes the message to the user terminal by including the representative item as an item associated with the group and by grouping messages included in the group in the message list.

According to an aspect of one or more example embodiments, there is provided a message providing system including a classifier configured to classify a message received at a user terminal for each group; a creator configured to create a representative item of a group using a message included in each group; and a provider configured to provide a message item through a message list of a message box that includes the message to the user terminal by including the representative item as an item associated with the group and by grouping messages included in the group in the message list.

A plurality of groups used for classifying the message may be predefined, and the classifier may be further configured to determine a group corresponding to the message among the plurality of groups based on message content parsed from the message.

The creator may be further configured to create the representative item using at least one of an undeleted message, an unread message, and a message received during a unit period, among messages included in each group, and a user interface for providing accumulated information or statistical information associated with messages of each group.

In the case of a group for managing an authentication related message, the creator may be further configured to create the representative item using at least one of an undeleted message and an unread message among messages included in the group.

In the case of a group for managing a delivery related message, the creator may be further configured to create the representative item using a message received during a unit period among messages included in the group.

In the case of a group for managing a financial transaction related message, the creator may be further configured to create the representative item using a user interface for providing accumulated information or statistical information associated with messages of the group.

According to some example embodiments, it is possible to further effectively configure a message list by providing messages grouped based on message content, and to enhance a message management quality by managing messages based on a group unit.

Also, according to some example embodiments, it is possible to apply a characteristic of an individual group and to provide a message through a further efficient group management environment by grouping messages included in a group using an item capable of representing the group and by providing the grouped messages.

Further areas of applicability will become apparent from the description provided herein. The description and specific examples in this summary are intended for purposes of illustration only and are not intended to limit the scope of the present disclosure.

BRIEF DESCRIPTION OF THE FIGURES

Example embodiments will be described in more detail with regard to the figures, wherein like reference numerals refer to like parts throughout the various figures unless otherwise specified, and wherein.

Figure 1:
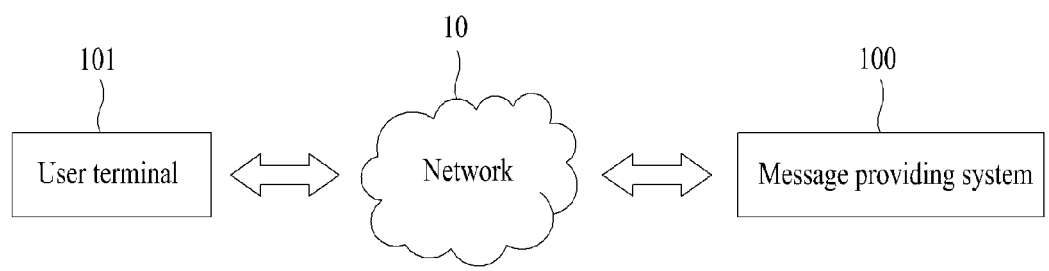
FIG. 1 is a diagram illustrating an example of a message providing environment according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as at least one of when preceding a list of elements, modify the entire list of elements and do not modify the individual elements of the list. Also, the term "exemplary" is intended to refer to an example or illustration.

When an element is referred to as being "on", "connected to", "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the related art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

Example embodiments relate to technology for providing a message stored in a storage box, and more particularly, to a message providing method, system, and non-transitory computer-readable recording medium that may provide messages grouped based on message content.

The term "message" used herein refers to unit information transmitted through a short message service (SMS), a multimedia messaging service (MMS), an enhanced messaging service (EMS), an instant messenger, a social network service (SNS), an email, and the like, and inclusively indicates any type of data transmitted and received between terminals over a communication network.

The term "bundle" used herein indicates a group unit used for grouping a plurality of messages into a single pack indicating, for example, a group and providing the grouped messages. Hereinafter, although a unit of grouped messages is referred to as a bundle, it has the same meaning as a group.

FIG. 1 is a diagram illustrating an example of a message providing environment according to at least one example embodiment. FIG. 1 illustrates a user terminal 101 and a message providing system 100. In FIG. 1, indicators with arrowheads may indicate that data is transmitted and received between the user terminal 101 and the message providing system 100 over a wired/wireless network 10.

The user terminal 101 may execute one or more processors configured to perform at least one of features described herein. The user terminal 101 may indicate any type of mobile terminals capable of installing and executing a service exclusive application (hereinafter, a message app) associated with the message reception notification system 100. Here, the user terminal 101 may perform the overall service operation, such as a service screen configuration, a data input, a data transmission and reception, and a data storage, under control of the message app.

For example, the user terminal 101 may include a personal computer (PC), a notebook computer, a laptop computer, a smartphone, a tablet, a wearable computer, etc., however, is not limited thereto.

The user terminal 101 may directly or indirectly connect to the network 10, for example, the Internet, a local area network (LAN), etc. For example, a PC and a notebook computer may be directly connected to the network 10 through a wired network connection. A laptop computer may be wirelessly connected to the network 10 through a wireless communication channel set between the laptop computer and a wireless access point (WAP). A smartphone may be wirelessly connected to the network 10 through a wireless communication channel set between the smartphone and a cellular network/bridge. Here, the network 10 may communicate with one or more secondary networks (not shown), for example, a LAN, a wide area network (WAN), and an intranet, however, is not limited thereto.

The user terminal 101 may communicate with the message providing system 100 over the network 10.

The message providing system 100 may execute one or more processors configured to perform at least one of the features described herein. The message providing system 100 may provide a message management environment for a message box associated with the user terminal 101 to the user terminal 101 that is a client in which the message app is installed. In particular, the message providing system 100 may provide a group management environment for messages and thus, may group messages into a bundle unit based on message content and may provide the grouped messages.

The message app associated with the message providing system 100 is configured to be available in a mobile environment in addition to a PC environment. The message app may be configured in an independently operating program form to operate in conjunction with a specific application, for example, a messaging application such as an SMS or an MMS, a messenger application, a mail application, an SNS application etc., associated with a message, or may be configured in an in-app form of the specific application to be operable on the application.

At least a portion of constituent elements of the message providing system 100 may be configured in a form of an application installed on the user terminal 101, or may be configured to be included in a platform that provides a service in a client-server environment.

The message providing system 100 corresponds to a server computer and may include, for example, a server computing device, a PC, a server computer, a series of server computer, a mini computer, and/or a main frame computer, however, is not limited thereto. The server system may be a distributive system and operations of the server system may be concurrently and/or sequentially executed on one or more processors.

Figure 2:
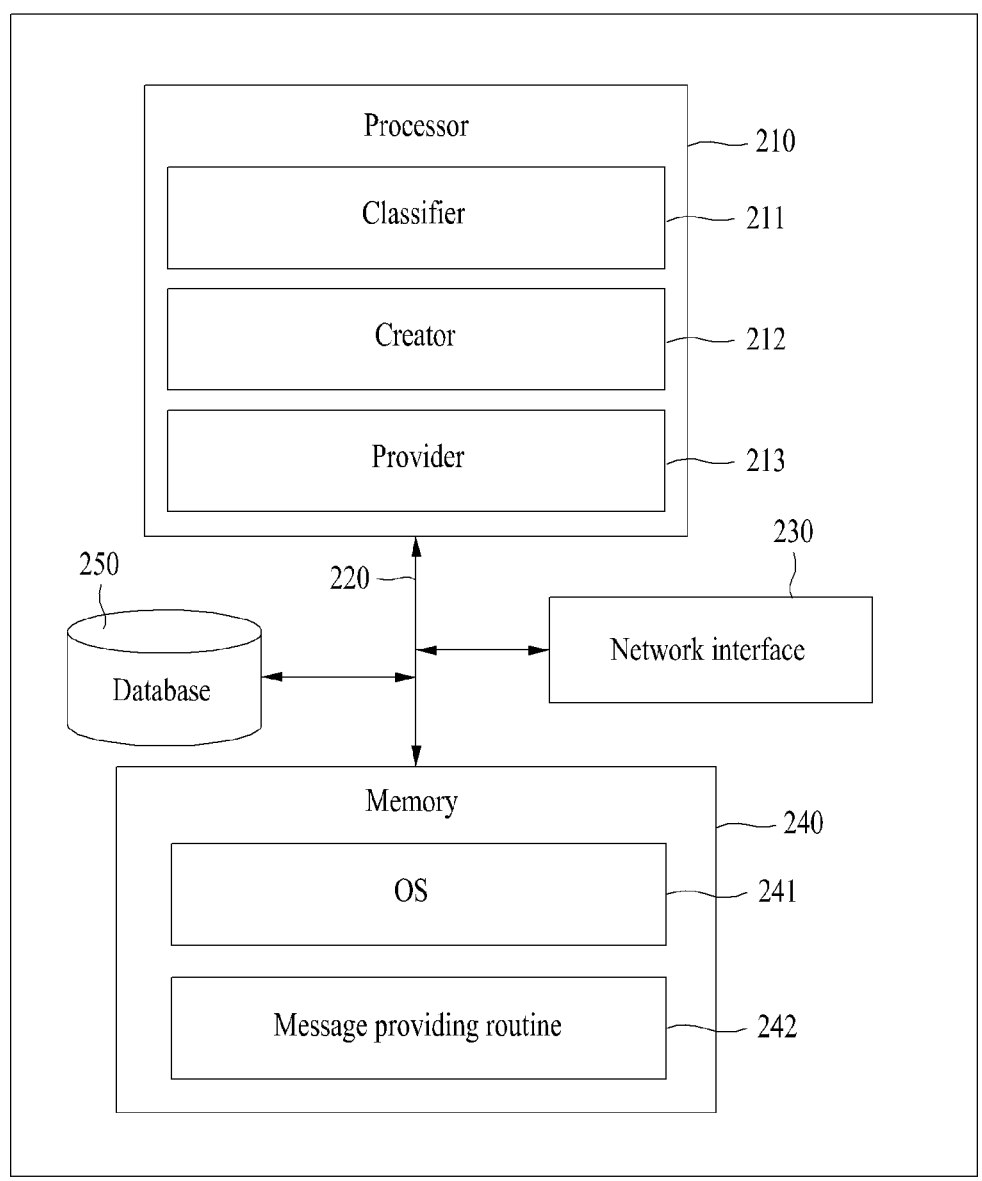
FIG. 2 is a block diagram illustrating a configuration of a message providing system according to at least one example embodiment.
Figure 3:
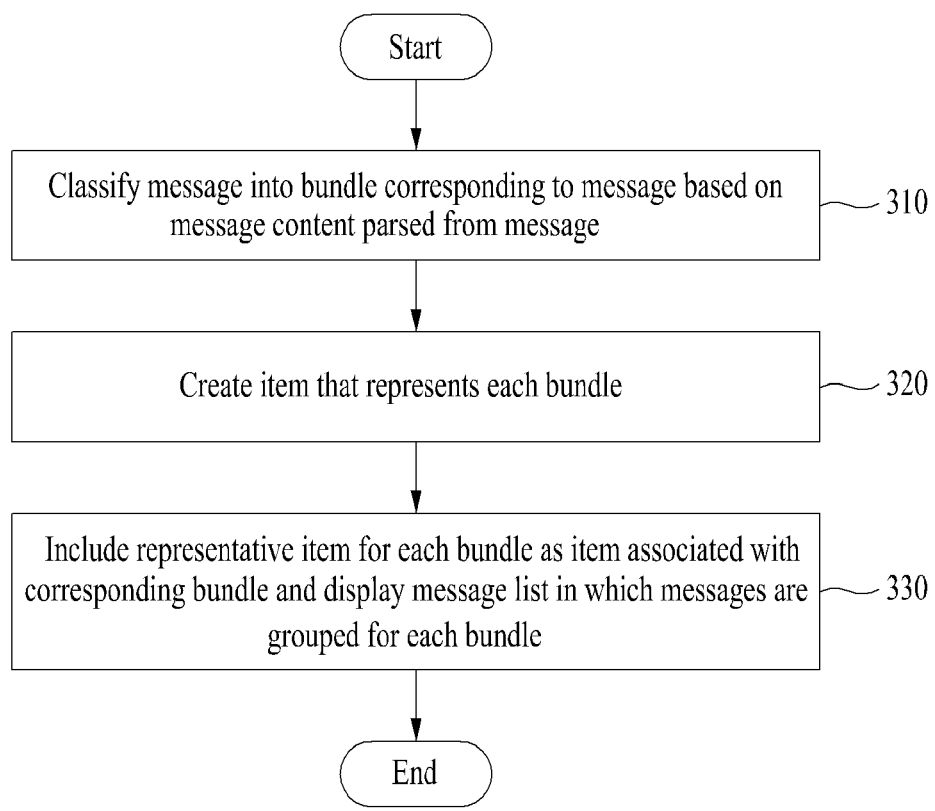
FIG. 3 is a flowchart illustrating a message providing method according to at least one example embodiment.

FIG. 2 is a block diagram illustrating a configuration of the message providing system 100 according to at least one example embodiment, and FIG. 3 is a flowchart illustrating a message providing method according to at least one example embodiment.

Referring to FIG. 2, the message providing system 100 includes a processor 210, a bus 220, a network interface 230, a memory 240, and a database 250. The memory 240 includes an operating system (OS) 241 and a message providing routine 242. The processor 210 incorporates a number of functional units including a classifier 211, a creator 212, and a provider 213. According to other example embodiments, the message providing system 100 may include a greater or lesser number of constituent elements than the number of constituent elements shown in FIG. 2. However, there is no need to clearly illustrate many constituent elements according to the related art. For example, the message providing system 100 may include other constituent elements, such as a display, a transceiver, etc.

The memory 240 may include a permanent mass storage device, such as random access memory (RAM), read only memory (ROM), a disk drive, etc., as a computer-readable storage medium. Also, program codes (e.g., computer-readable instructions) for the OS 241 and the message providing routine 242 may be stored in the memory 240. Such software constituent elements may be loaded from another computer-readable storage medium separate from the memory 240 using a drive mechanism (not shown). The other computer-readable storage medium may include, for example, a floppy drive, a disk, a tape, a DVD/CD-ROM drive, a memory card, etc. Software constituent elements may be loaded to the memory 240 through the network interface 230 instead of, or in addition to, the computer-readable storage medium.

The bus 220 enables communication and data transmission between the constituent elements of the message providing system 100. The bus 220 may be configured using a high-speed serial bus, a parallel bus, a storage area network (SAN), and/or another appropriate communication technology.

The network interface 230 may be a computer hardware constituent element for connecting the message providing system 100 to the computer network. The network interface 230 may connect the message providing system 100 to the computer network through a wireless and/or wired connection.

The database 250 may serve to maintain a message box and to store and maintain messages transmitted and received through the user terminal 101. Here, the messages stored in the database 250 may include time information and may be managed in a form of a timeline. Further, the stored messages may be classified and thereby provided based on a date, a counter party (sender/recipient), and the like. In particular, the database 250 may include notification information about a received message. In particular, the database 250 may include information used to manage messages based on a bundle unit, for example, predefined information about a plurality of message types and bundles, code information used to configure a user interface for each bundle, and the like.

Although FIG. 2 illustrates that the database 250 is included in the message providing system 100, it is an example only. Thus, the database 250 may be omitted based on a system configuration method, an environment, etc. Alternatively, an entire database or a portion of the database may be preset as an external database constructed on a separate system. Additionally, the database 250 may be configured as a local database that is included in an application installed on the user terminal 101.

The processor 210 may be configured to process computer-readable instructions of a computer program by performing a basic arithmetic operation, a logic operation, and an input/output operation of the message providing system 100. The computer-readable instructions may be provided from the memory 240 and/or the network interface 230 to the processor 210 through the bus 220. The processor 210 may be configured to execute program codes for the classifier 211, the creator 212, and the provider 213. The program codes may be stored in a storage device, such as the memory 240.

The classifier 211, the creator 212, and the provider 213 may be configured to perform operations 310 through 330 of FIG. 3.

In operation 310, the classifier 211 classifies a message into a bundle corresponding to the message based on message content parsed from the message. A plurality of message types and a plurality of bundles, that is, a plurality of groups for the respective message types may be predefined to classify a message. Once a message is received at the user terminal 101, the classifier 211 may determine a message type corresponding to the received message based on a rule for each predefined message type by reading the received message and parsing content of the received message, and may determine a bundle corresponding to the message. For example, a bundle may include an authentication bundle for classifying an authentication related message, a card bundle for classifying a card payment message, a bank bundle for classifying a banking transaction message, a delivery bundle for classifying a delivery related message, a smishing bundle for classifying a suspected smishing message, an advertising bundle for classifying an advertising message, and the like. That is, the classifier 211 may determine a bundle corresponding to a received message among a plurality of bundles based on message content parsed from the received message.

For example, the classifier 211 may determine a message type of a received message as an authentication related message by determining whether an authentication number or an approval number is included in the message and may classify the message into an authentication bundle. As another example, the classifier 211 may determine a message type of a received message as a delivery related message by determining whether delivery related information of at least one of a keyword associated with a delivery, an order number, an invoice number, and the like is included in the message and may classify the message into a delivery bundle.

As another example, the classifier 211 may determine a message type by determining whether sender information, for example, a sender telephone number, a sender name, etc., of the message is included in predefined management target information. Here, the sender information may be content directly included in the received message or may be content identified at the user terminal 101 from the received message. For example, the classifier 211 may determine a message type of a received message as a finance related message based on whether a sender telephone number is included in a financial database, for example, a database in which telephone numbers of financial companies to be managed are stored.

Here, in the case of the finance related message, the classifier 211 may classify the corresponding message into a card bundle or a bank bundle by classifying the type of the message as a card payment message based on whether card payment details are included in message content and by classifying the type of the message as a banking transaction message based on whether banking transaction details are included in the message content. As another example, the classifier 211 may determine the type of a corresponding message as a smishing message by determining whether a file download link, for example, a uniform resource locator (URL), etc., at which APK is downloaded, is included in the message and may determine a bundle corresponding to the message.

As another example, the classifier 211 may determine the type of a corresponding message as an advertising message by determining whether an advertising phrase or a keyword associated with advertising is included in the message and may determine a bundle corresponding to the message.

The classifier 211 may determine a message type by applying at least one of the aforementioned message classification methods. In addition, the classifier 211 may add or expand a bundle unit by additionally using a variety of criteria for determining a message type within the known art.

In operation 320, the creator 212 creates an item (hereinafter, a representative item) that represents each bundle. In response to a user access to a message box through the user terminal 101, a message list that includes message stored in the message box as an item may be displayed. Here, when indicating message items using the message list of the message box, a representative item for each bundle may be included in the message list of the message box. The creator 212 may create a representative item in consideration of the characteristic of a bundle for each bundle, and may create a representative item of each bundle based on the most recent message within a bundle, message content parsed from each of messages within the bundle, or information accumulated based on messages within the bundle.

In operation 330, in response to a user access to the message box associated with the user terminal 101 through the user terminal, the provider 213 provides the message list of the message box to the user terminal. Here, messages included in a corresponding bundle may be grouped and thereby displayed for each bundle in the message list. In particular, the representative item created in operation 320 may be included as an item associated with the corresponding bundle for each bundle. Here, the representative item may include information that represents the bundle, a function applicable to all of or a portion of messages included in the bundle, and the like. The provider 213 may configure the representative item as an item included in the bundle, and may use the representative item as an item to be displayed on a message list based on a bundle type. In the case of using a representative item as an item to be displayed on a message list, the provider 213 may sort representative items for the respective bundles on the message list and may group messages included in a corresponding bundle through a representative item of each bundle and may display the grouped messages. Accordingly, the provider 213 may provide a message management environment capable of providing messages grouped into a bundle unit based on message content. The provider 213 may provide a different management environment for each bundle based on the characteristic of each bundle. For example, in the case of an authentication bundle, the provider 213 may provide a function of deleting all of messages included in the authentication bundle, a function of automatically deleting a message corresponding to a preset condition, and the like. In the case of a card bundle, the provider 213 may provide a function of providing statistical information about all cards being used, a function of providing statistical information about an individual card being used, and the like. In the case of a bank bundle, the provider 213 may provide a function of providing statistical information about all banks being used, a function of providing statistical information about an individual bank being used, a function of publishing message content in response to an additional action and the like. In the case of a delivery bundle, the provider 213 may provide a function of providing a delivery status, a function of providing a delivery route, and the like.

As described above, a representative item for each bundle may include information that represents a bundle, a function applicable to all of or a portion of messages included in the bundle, and the like, as an item of the bundle. For example, a representative item may include a user interface capable of applying a predefined function, for example, a delete function, a block function, a report function, and the like, in response to a user selection of a bundle and may be used as an item to be displayed on a message list based on the bundle type.

Figure 4:
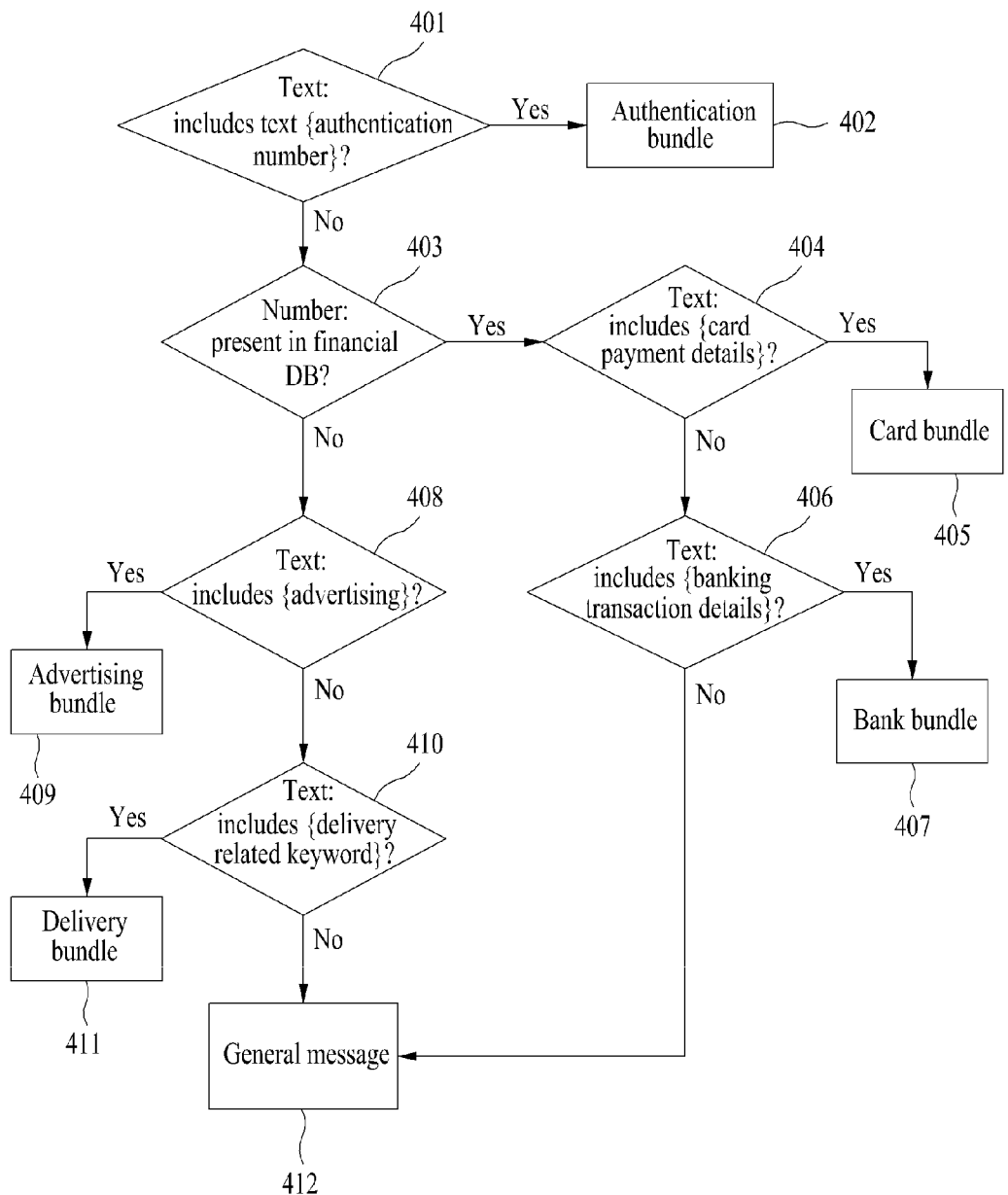
FIG. 4 is a flowchart illustrating a process of classifying a bundle based on message content according to at least one example embodiment.

FIG. 4 is a flowchart illustrating a process of classifying a bundle based on message content according to at least one example embodiment. Operations of FIG. 4 may be performed by the classifier 211 of FIG. 2.

Referring to FIG. 4, in operation 401, the classifier 211 determines whether a text of a received message includes an authentication number or an approval number based on message content parsed from the received message.

In operation 402, when the text of the received message includes the authentication number or the approval number, the classifier 211 determines the type of the received message as an authentication related message and classifies the received message into an authentication bundle.

In operation 403, when the text of the received message does not include the authentication number or the approval number, the classifier 211 determines whether a sender telephone number of the received message is present in a financial company telephone number database.

In operation 404, when the sender number of the received message is present in the financial company telephone number database, the classifier 211 determines whether the text of the received message includes card payment details, for example, a billing amount.

In operation 405, when the text of the received message includes card payment details, the classifier 211 determines the type of the received message as a card payment message and classifies the received message into a card bundle.

In operation 406, when the text of the received message does not include card payment details, the classifier 211 determines whether the text of the received message includes banking transaction details, for example, a deposit amount, a withdrawal amount, and the like.

In operation 407, when the text of the received message includes banking transaction details, the classifier 211 determines the type of the received message as a banking transaction message and classifies the received message into a bank bundle.

In operation 408, when the sender telephone number of the received message is absent in the financial company telephone number database, the classifier 211 determines whether the text of the received message includes "advertising" corresponding to a specific keyword is present in the financial company telephone number database.

In operation 409, when the text of the received message includes an advertising phrase, the classifier 211 determines the type of the received message as an advertising message and classifies the received message into an advertising bundle.

In operation 410, when the text of the received message does not include the advertising phrase, the classifier 211 determines whether the text of the received message includes at least one delivery related keyword, for example, a product, an order, shopping, reservation, shipment, deliver, etc., or includes an order number or an invoice number.

In operation 411, when the text of the received message includes the delivery related keyword, the classifier 211 determines the type of the received message as a delivery related message and classifies the received message into a delivery bundle.

In operation 412, when the received message does not correspond to one of an authentication related message, a card payment message, a banking transaction message, a delivery related message, and an advertising message, the classifier 211 determines a type of the received message as a general message. Here, the general message may be provided as an individual message and may be excluded from a management target based on a bundle unit.

The message types described with FIG. 4 are provided as examples only and any message type classifiable based on a bundle unit through message parsing may be additionally applicable. A process of determining a message type is also provided as an example. Thus, additional operations may be further included based on a predefined message type and orders or locations of operations may be changed.

Figure 5:
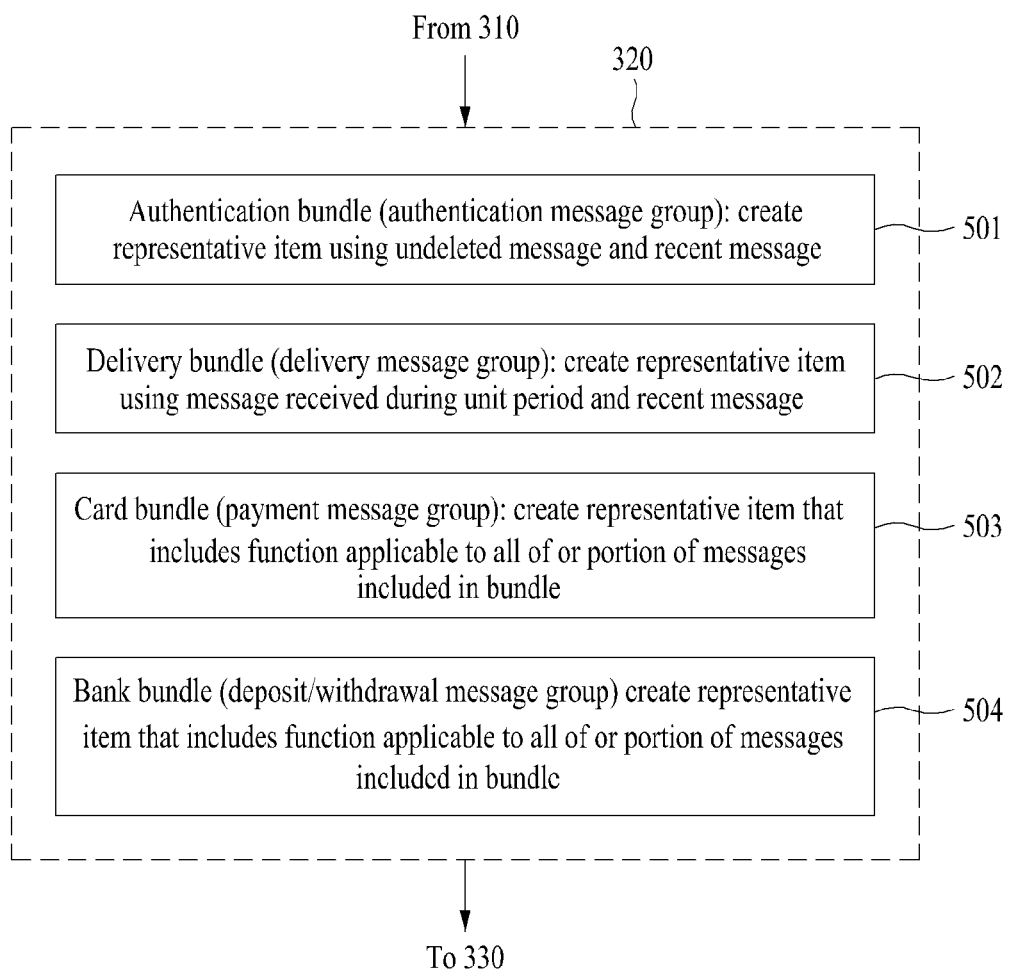
FIG. 5 is a flowchart illustrating a process of creating a representative item for each bundle according to at least one example embodiment.

FIG. 5 is a flowchart illustrating a process of creating a representative item for each bundle according to at least one example embodiment. Operations of FIG. 5 may be performed by the creator 212 of FIG. 2.

In operation 501, the creator 212 may create a representative item of an authentication bundle using an undeleted authentication related message and the most recent authentication related message among messages included in the authentication bundle. The creator 212 may create a number of undeleted authentication related messages and at least a portion of content of the recent authentication related message as the representative item of the authentication bundle. As another example, the creator 212 may create a representative item of an authentication bundle using an unread authentication related message among messages included in the authentication bundle. Here, the representative item of the authentication bundle may include a user interface of a function, for example, a delete function and the like, applicable to all of or a portion of the messages included in the authentication bundle.

In operation 502, the creator 212 may create a representative item of a delivery bundle using a delivery related message received during a unit period and the most recent delivery related message among messages included in the delivery bundle. For example, the creator 212 may collect delivery related messages based on a day unit and may create a number of delivery related messages received today as a representative item. Here, the representative item of the delivery bundle may include information about a delivery status verifiable as the delivery related message. The delivery related message may be classified into a product shipment message indicating that shipping of a product is due, an in-delivery message indicating that a product has shipped, a delivery complete message indicating that the delivery of a product is completed, and the like, through message parsing, and may create counts for each message as a representative item. Here, the representative item of the delivery bundle may include a user interface of a function, for example, a reference function and the like, applicable to all of or a portion of the messages included in the delivery bundle.

In operation 503, the creator 212 may create a representative item that includes a function applicable to all of or a portion of messages included in a card bundle. Here, the creator 212 may create an item that includes a user interface of a function, for example, an abstract/report view button, of providing at least a portion of content of a recent card payment message and accumulated information based on messages included in the card bundle.

In operation 504, the creator 212 may create a representative item that includes a function applicable to all of or a portion of messages included in a bank bundle. Here, the creator 212 may create an item that includes a user interface of a function, for example, an abstract/report view button, of providing at least a portion of content of a recent banking transaction message and messages included in the bank bundle.

In the case of a specific bundle, the creator 212 may use the most recent advertising message as an item to be displayed on a message list instead of separately creating information that represents the bundle. Also, the creator may create a representative item that includes a function, for example, a delete function, a block function, etc., applicable to all of or a portion of messages included in the bundle. For example, in the case of an advertising bundle, the most recent message among received advertising messages may be displayed on a message list. In response to the selection of the advertising bundle from the message list, a delete function of deleting an advertising message in the advertising bundle may be immediately called, or a switch to a service screen that includes the delete function may be supported.

The representative items for the respective bundles described with FIG. 5 are provided as examples only. The example embodiments are not limited thereto and may be variously modified and expanded.

FIGS. 6 through 19 illustrate examples of a user interface screen on the user terminal 101 associated with a message box according to at least one example embodiment.

Figure 6:
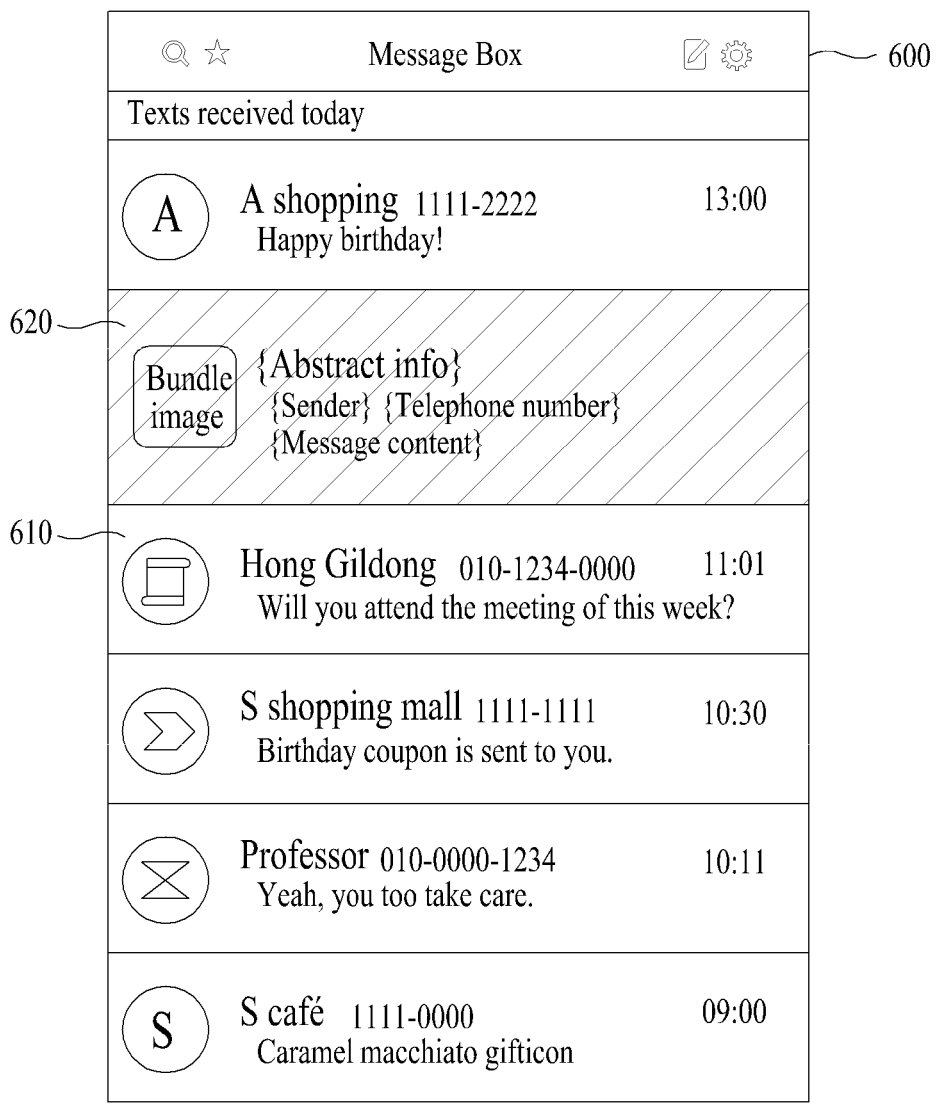
FIGS. 6 through 19 illustrate examples of a user interface associated with a message box according to at least one example embodiment.

FIG. 6 illustrates a message list screen 600 of a message box according to at least one example embodiment. Referring to FIG. 6, message items may be sorted in descending order of a message reception/transmission time and displayed on the message list screen 600.

A general message is ranked in the message list as an individual message item 610. In the case of an authentication related message, a delivery related message, a card payment message, a banking transaction message, and the like, the same type of messages may be grouped and ranked in the message list as a bundle item 620. The bundle item 620 may include a representative item that is created based on a characteristic of a corresponding bundle for each bundle.

By applying a method of changing a display attribute of an item that configures the message list, the bundle item 620 included in the message list may be displayed to be distinguished from the individual message item 610 on the message list screen 600.

Figure 7:
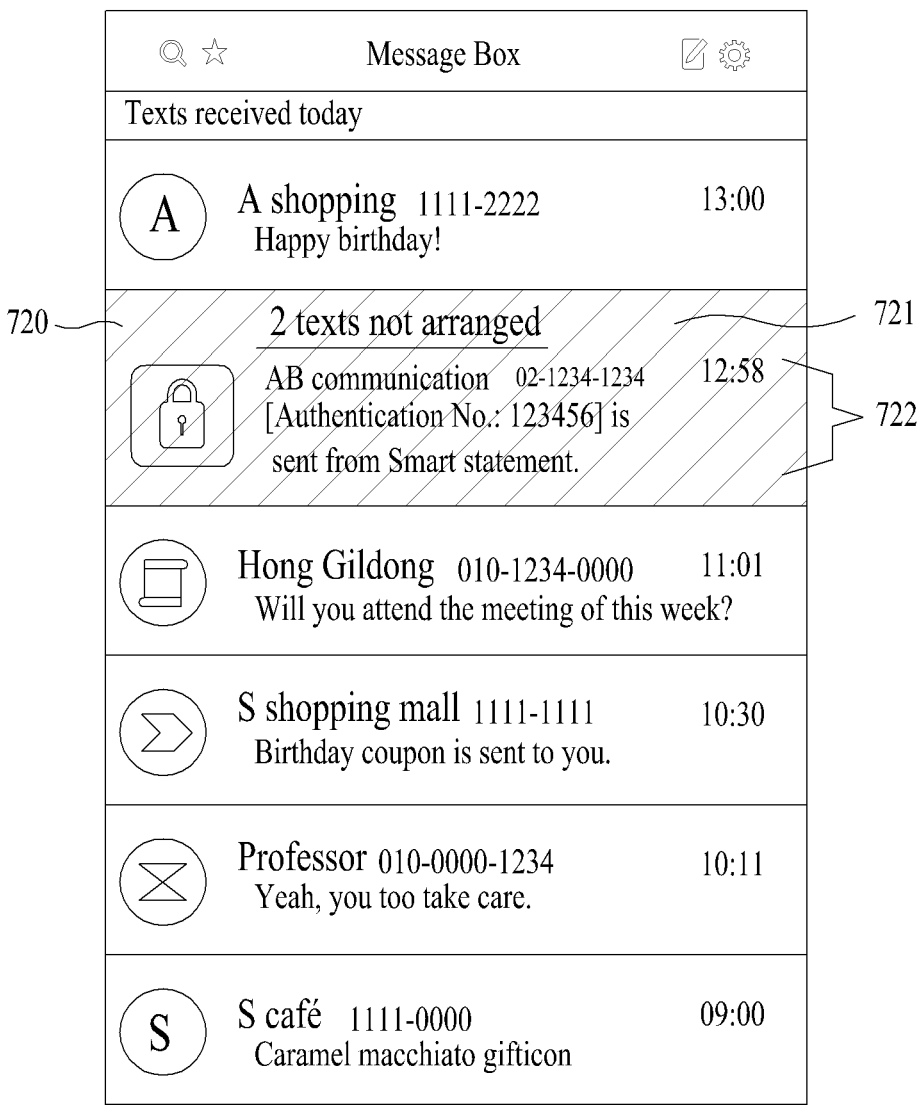

FIG. 7 illustrates an authentication bundle item 720 ranked in a message list according to at least one example embodiment. An authentication bundle refers to a bundle capable of verifying an undeleted authentication related message. Referring to FIG. 7, an authentication bundle item 720 may include a number 721 of undeleted authentication related messages and at least a portion 722 of content of the most recent authentication related message as a representative item of the authentication bundle.

Figure 8:
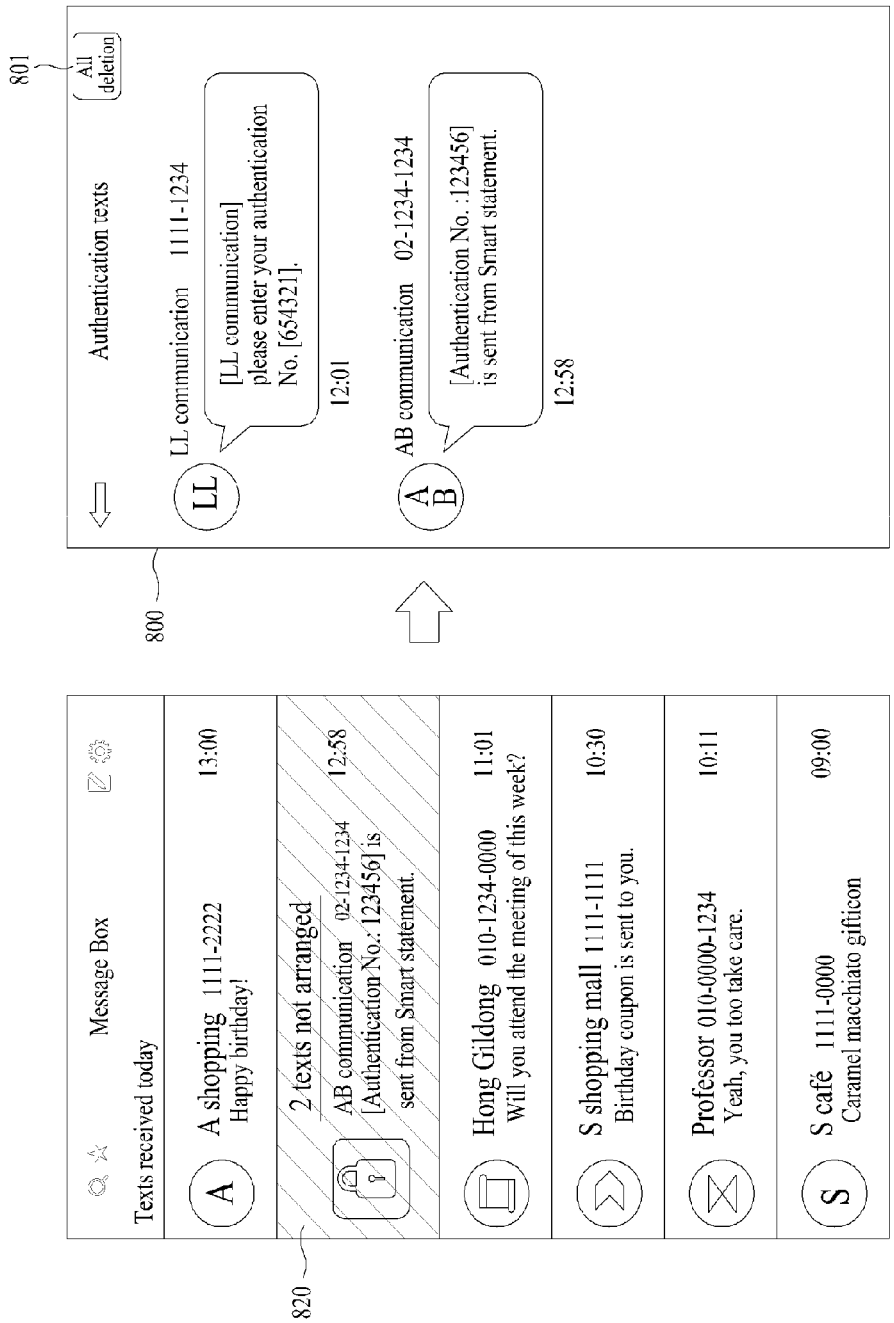

Referring to FIG. 8, in response to the selection of an authentication bundle item 820 from a message list, a user may connect to an authentication bundle detail screen 800. For example, authentication related messages may be collected and displayed on the authentication bundle detail screen 800 among messages configured based on a chatroom unit and stored in a message box. Messages classified as authentication related messages may be sorted based on a message reception time and displayed on the authentication bundle detail screen 800. For example, the most recent authentication related message may be sorted at the bottom end of the authentication bundle detail screen 800.

The authentication bundle detail screen 800 may include a delete button 801 as a user interface capable of deleting a message included in the authentication bundle. Here, the delete button 801 may include at least one of a delete-all button for deleting all of messages included in the authentication bundle, a select-and-delete button for selecting and deleting at least a portion of the messages included in the authentication button, and a set-and-delete button for setting a message corresponding to a present criterion, for example, a read message to be automatically deleted.

Figure 9:
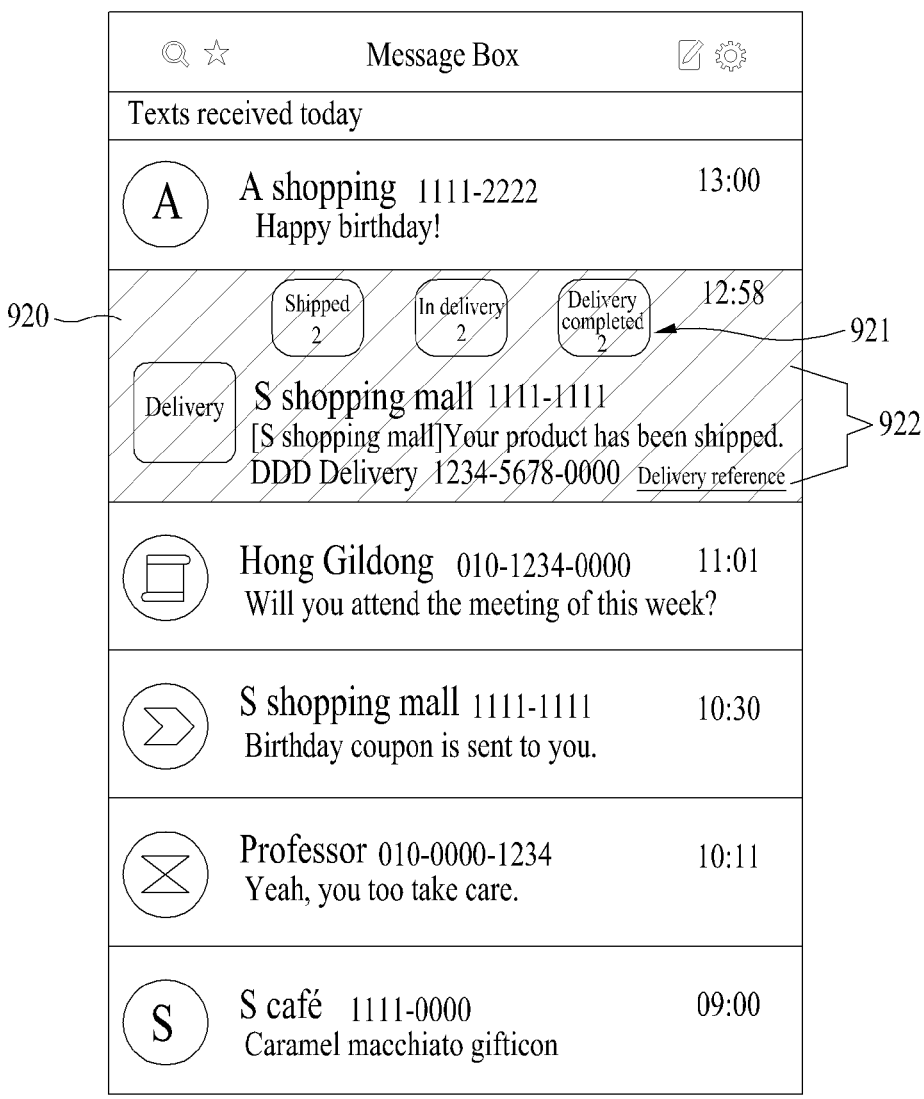

FIG. 9 illustrates a delivery bundle item 920 ranked in a message list according to at least one example embodiment. A delivery bundle refers to a bundle capable of verifying a delivery related message and a delivery route. Referring to FIG. 9, the delivery bundle item 920 may include a number 921 of delivery related messages received today and at least a portion 921 of content of the most recent delivery related message as a representative item of the delivery bundle. Here, a number of messages may be indicated on the delivery bundle item 920 for each of a product shipment message, an in-delivery message, and a delivery-complete message. That is, the delivery bundle may include an item capable of verifying the number of products shipped/in delivery/delivered today.

Figure 10:
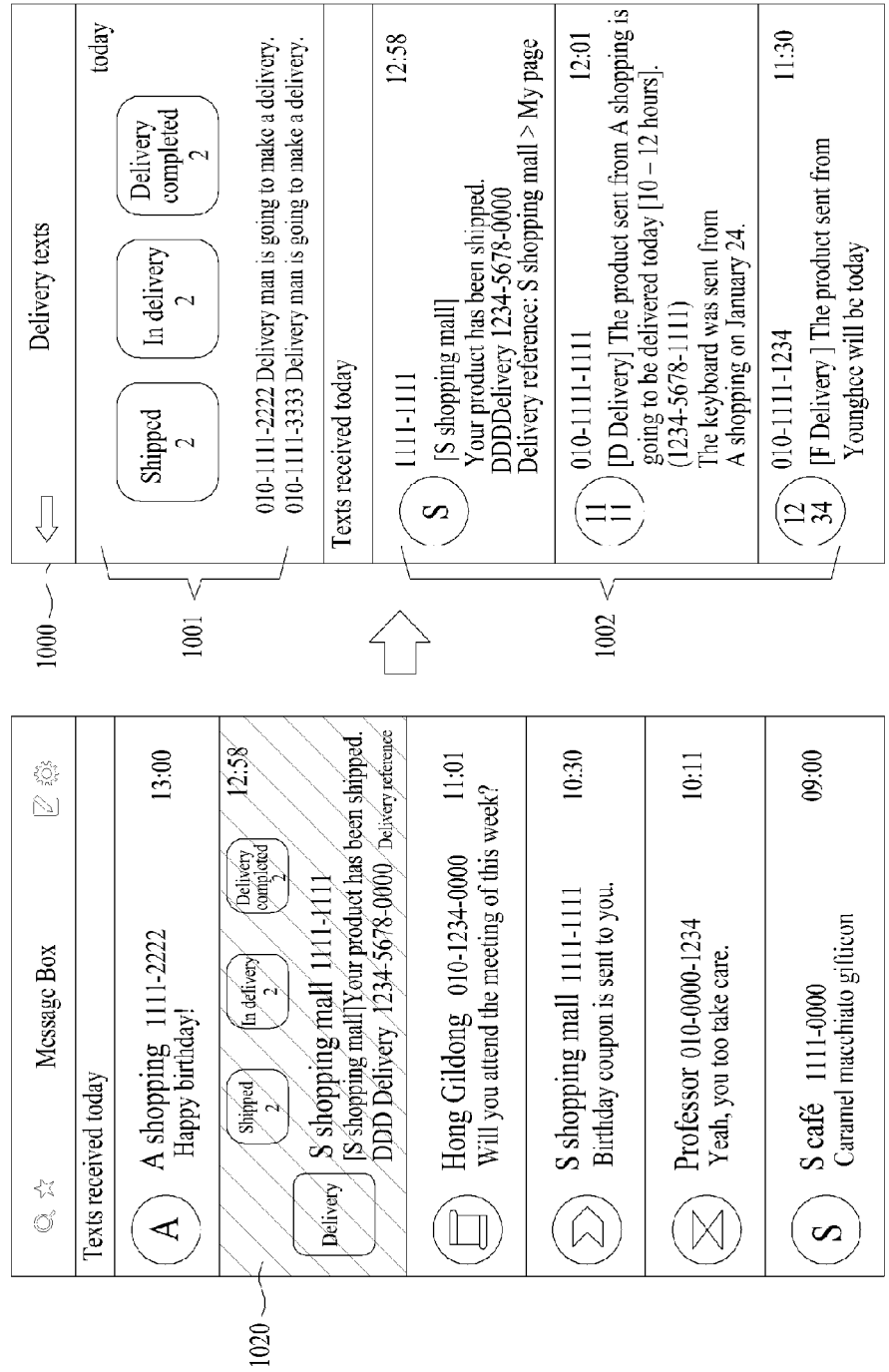

Referring to FIG. 10, in response to the selection of a delivery bundle item 1020 from a message list, a user may connect to a delivery bundle detail screen 1000. For example, the delivery bundle detail screen 1000 may include a message list 1002 in which delivery related messages classified into a delivery bundle are sorted in descending order from the latest to the oldest and a dash board 1001 showing the delivery status. The message list 1002 may be configured based on a chatroom unit, such as in an authentication bundle.

The dash board 1001 may show a number of products shipped/in delivery/delivered today. In response to the selection of the dash board 1001 displayed on the delivery bundle detail screen 1000, the current delivery status tracked with a telephone number may be displayed and a route capable of landing on a detail tracking page based on an individual product unit may be provided. That is, the user may verify the delivery shipment history and the tracking status associated with a telephone number through the dashboard 1001 regardless of the received message.

Figure 11:
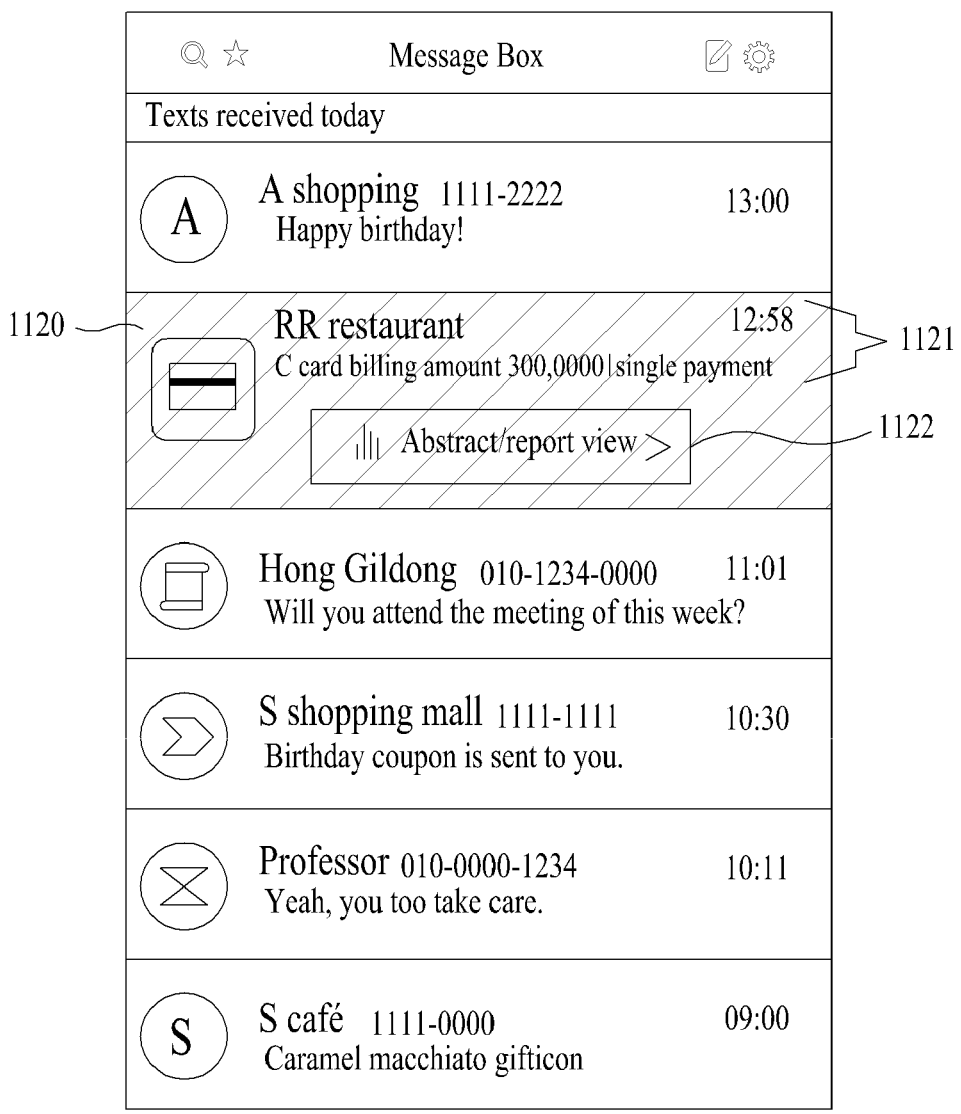

FIG. 11 illustrates a card bundle item 1120 ranked in a message list according to at least one example embodiment. A card bundle refers to a bundle for verifying a card payment history based on a unit time, for example, a month, and a total amount. Referring to FIG. 11, the card bundle item 1120 may include an abstract/report view button 1122 and at least a portion 1121 of content of the most recent card payment message as a user interface for verifying a card payment history and a total amount as a representative item of the card bundle. Here, the at least a portion 1121 of content of the card payment message may include the place where the credit card was used, the credit card used, the billing amount, the type of payment (single payment/installment), and the like.

Figure 12:
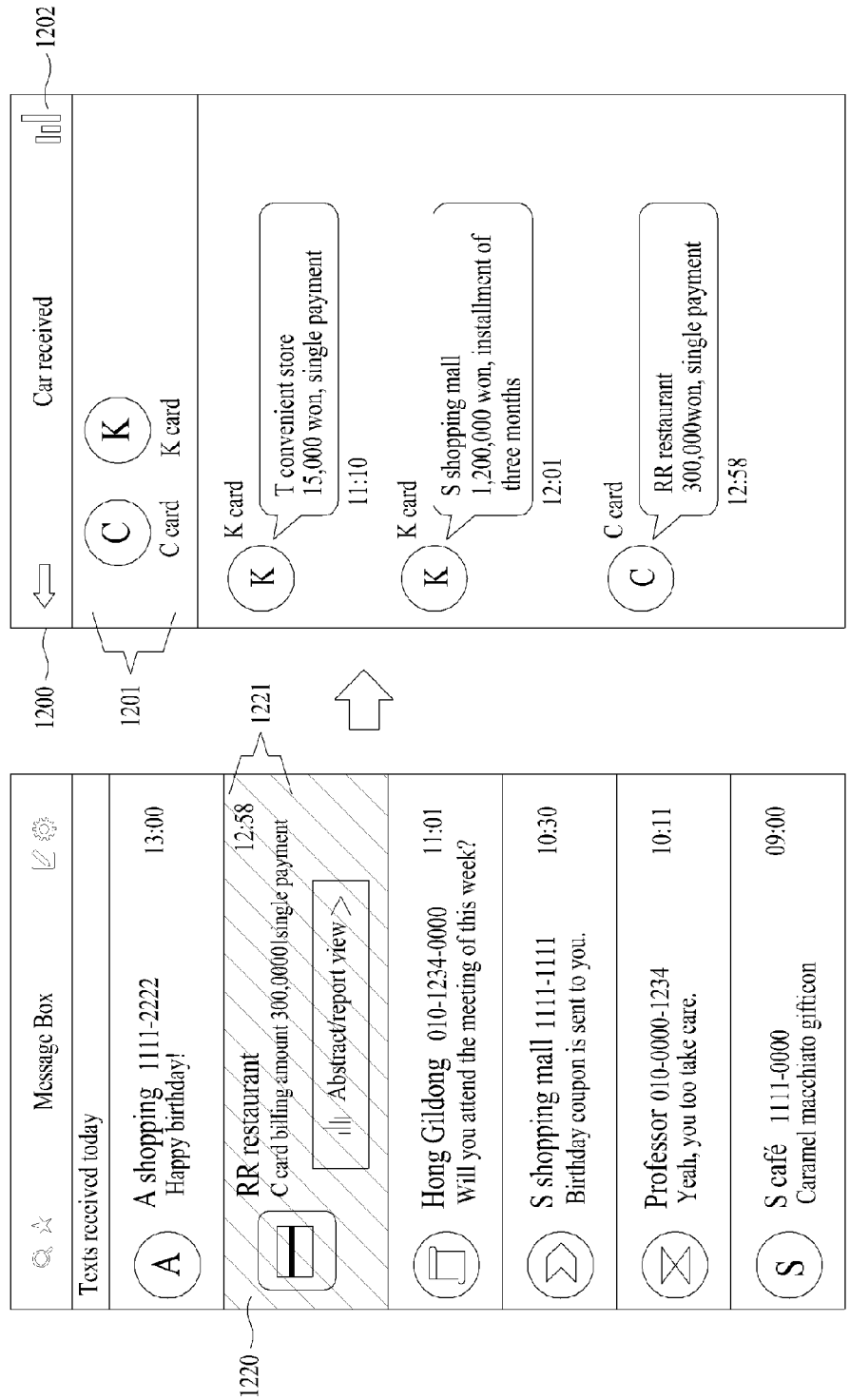

Referring to FIG. 12, in response to the selection of message content 1221 from a card bundle item 1220 of a message list, a user may connect to a card bundle detail screen 1200. For example, card payment messages may be collected and displayed on the card bundle detail screen 1200 among messages that are configured based on a chatroom unit and stored in a message box. Messages classified as card payment messages may be sorted based on message reception time and displayed on the card bundle detail screen 1200. For example, the most recent card payment message may be sorted at the bottom end of the card bundle detail screen 1200. In particular, the card bundle detail screen 1200 may include a card company list 1201 as a configuration capable of classifying and thereby verifying a card payment message for each credit card company. Here, the card company list 1201 may be configured based on card company information that is matched to an originating number of a card payment message or message content parsed from a message.

The card bundle detail screen 1200 may include a statement button 1202 as a user interface for accessing a statement that provides details about the card.

Figure 13:
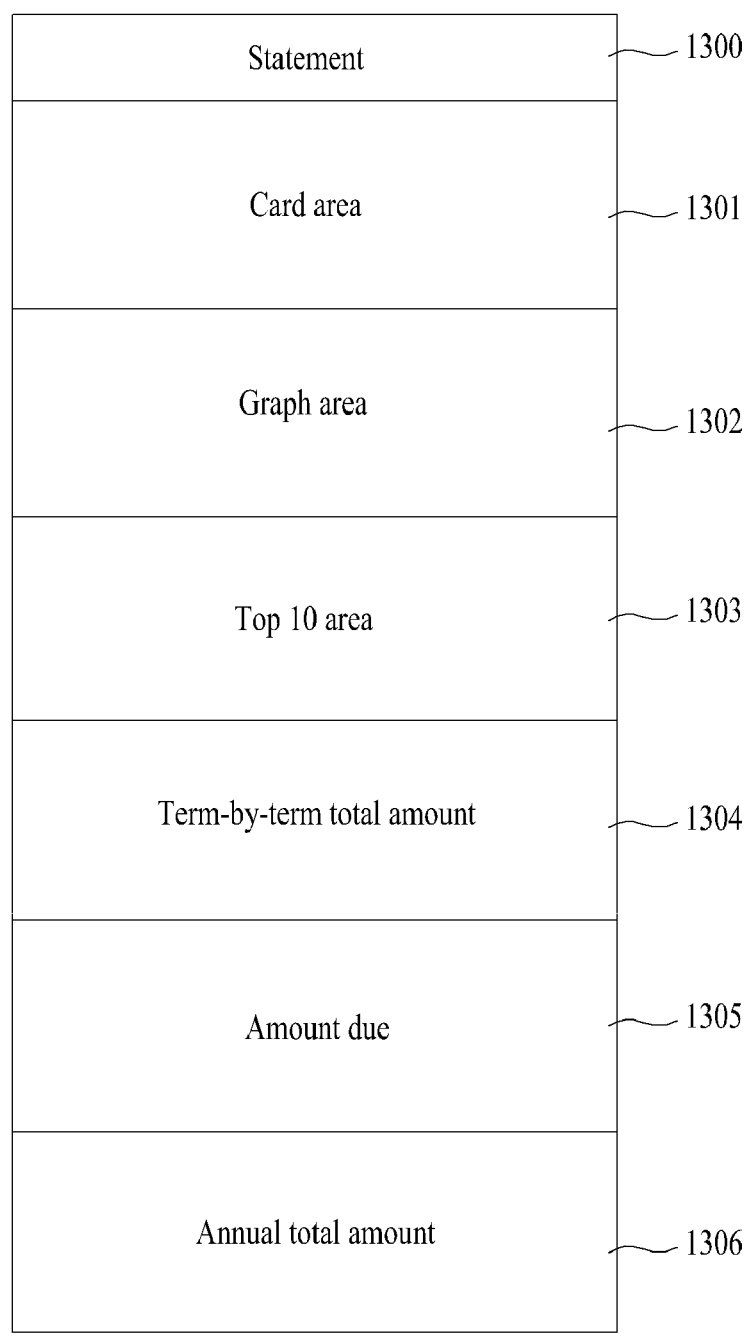

Referring to FIG. 13, in response to the selection of the statement button 1202 on the card bundle detail screen 1200 of FIG. 12, a user may connect to a card statement screen 1300. Here, the card statement screen 1300 may provide card details monitored and identifiable through a card payment message, and may provide card details with respect to all of the credit cards being used by the user or card details for each credit card type, for example, a consumer credit card, a check card, a corporate credit card, etc., or the respective individual credit cards being used by the user.

For example, the card statement screen 1300 may include a card area 1301 for displaying an amount accumulated during an aggregation term for each credit card type or each individual credit card, a graph area 1302 for displaying a monthly used amount for each credit card type or each individual credit card using a graph, a top area 1303 for displaying a preset (or, alternatively, desired) number of, for example, five or ten, most recent credit card uses during an aggregation term, a term-by-term total amount area 1304 for displaying a total amount accumulated during an aggregation term for each individual credit card, an amount due area 1305 for displaying an amount due for each individual credit card, an annual total amount area 1306 for displaying an annual total amount used for each credit card type or each individual credit card, and the like.

Figure 14:
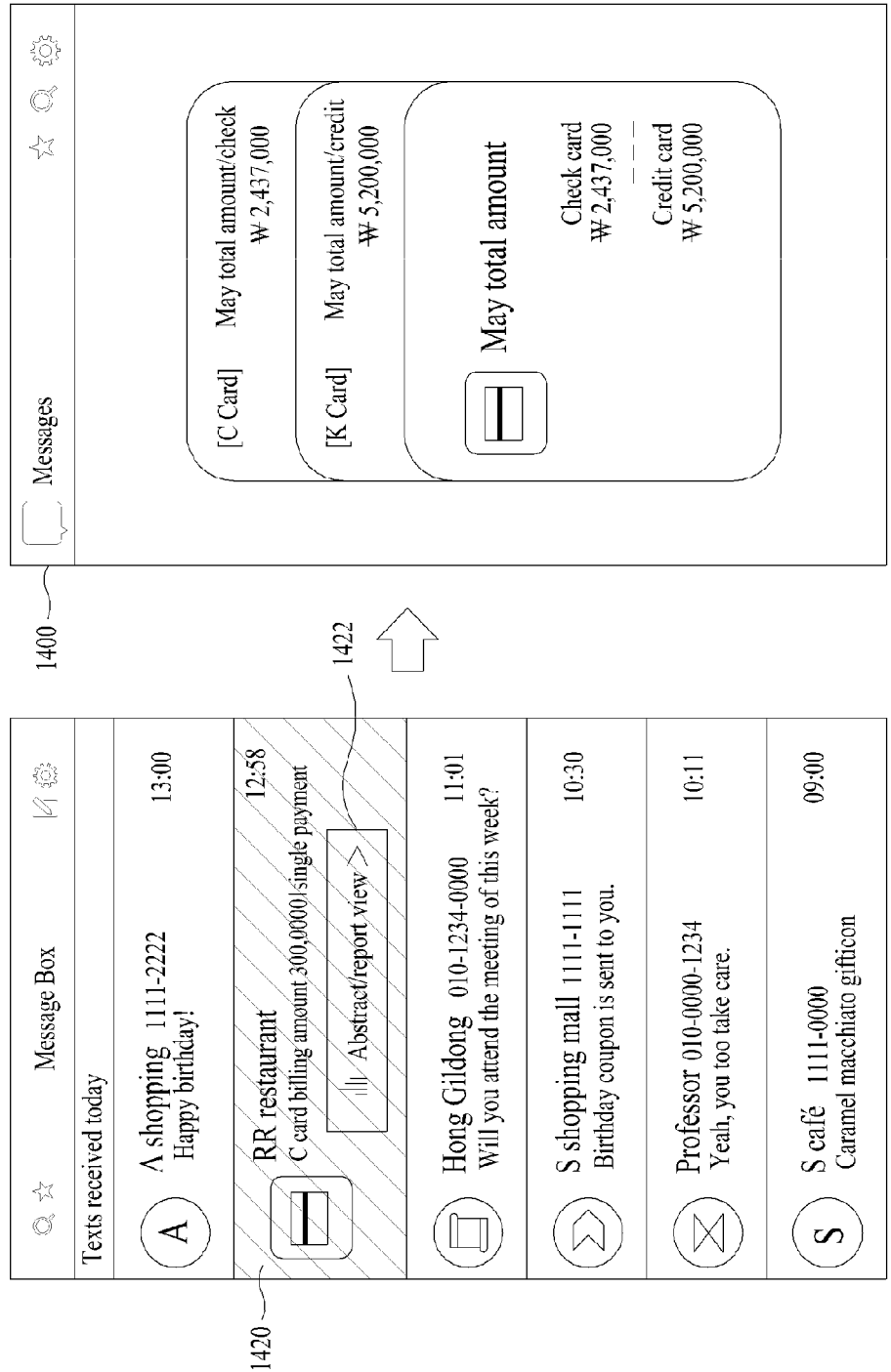

Referring to FIG. 14, in response to the selection of an abstract/report view button 1422 from a card bundle item 1420 of a message list, a user may connect to a card detail screen 1400. For example, a total amount used for each credit card company or each individual credit card and the entire amounts may be distinguishably displayed on the card detail screen 1400 as credit card use details of a corresponding month. The total amount used for each credit card company may be classified and thereby provided for each credit card type, such as a consumer credit card, a check card, a corporate credit card, and the like. The card detail screen 1400 may include a function of collectively displaying card payment messages for each credit card company or each individual credit card, a function of collectively displaying card payment messages for each month, a function of displaying comparison results about total amounts for the respective credit card companies, comparison results about total amounts for the respective months, and the like, using a variety of graphs, tables, and the like. Accordingly, the card detail screen 1400 using a card bundle may provide credit card use details for each credit card company and for each individual credit card of a corresponding credit card company.

The card detail screen 1400 may provide a card list monitored and identifiable through a card payment message. Here, in response to the selection of a specific credit card from the card list, the user may connect to a card report screen (not shown) that provides report information associated with a corresponding credit card. Here, the card report screen may be configured to be similar to the card statement screen 1300 of FIG. 13, and may include a card area for displaying an amount accumulated during an aggregation term of an individual credit card, a graph area for displaying a monthly used amount of an individual credit card using a graph, a top area for displaying a preset (or, alternatively, desired) number of, for example, five or ten, recent credit card uses during an aggregation term, an amount due area for displaying an amount due of an individual credit card, an annual total amount area for displaying a total amount of an individual credit card used during a year, and the like.

Similar to the card detail screen 1300, the card report screen may be configured to display report information about an individual credit card and report information about all of the credit cards or each individual credit card type.

Figure 15:
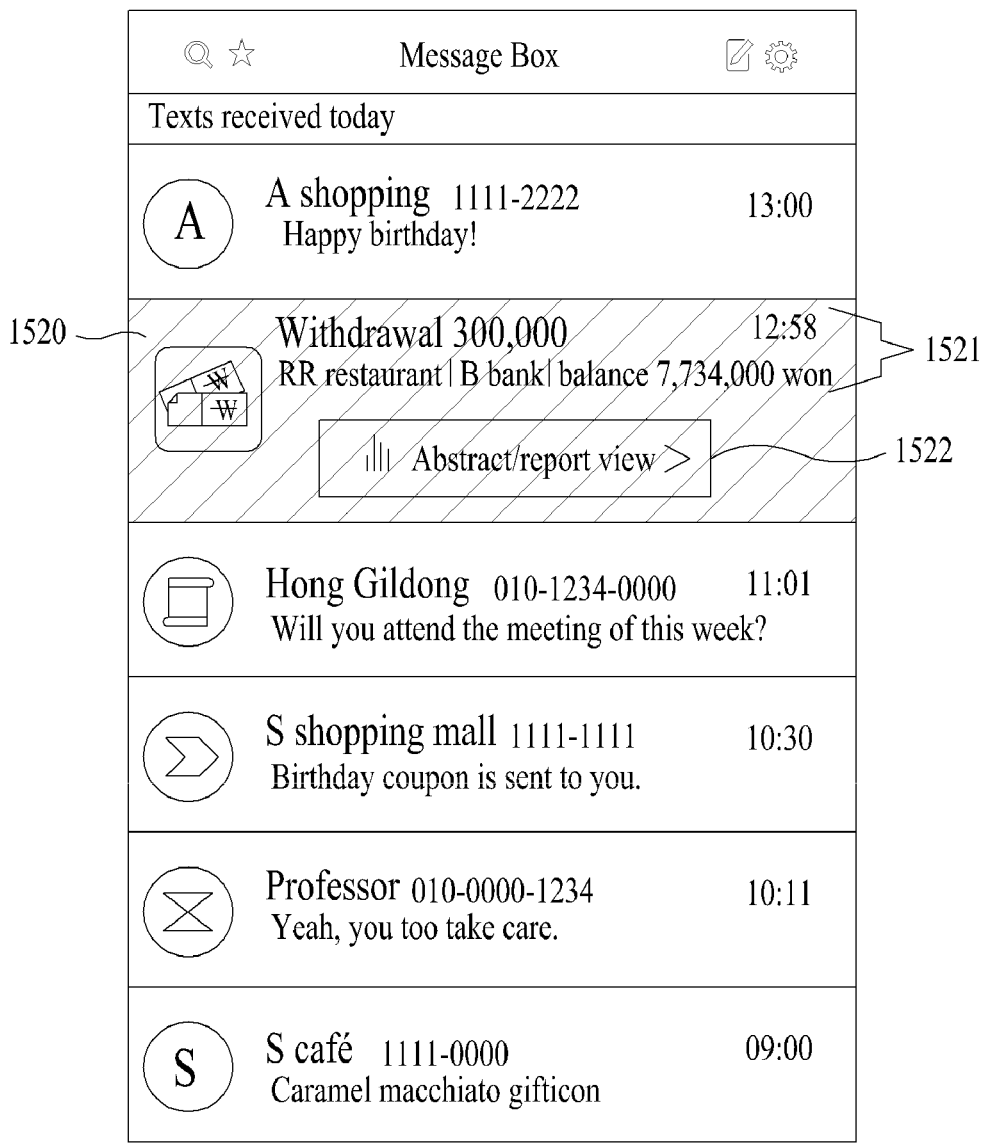

FIG. 15 illustrates a bank bundle item 1520 ranked in a message list according to at least one example embodiment. A bank bundle refers to a bundle for verifying a banking transaction history and a total amount based on a unit time, for example, a month. Referring to FIG. 15, the bank bundle item 1520 may include an abstract/report view button 1522 and at least a portion 1521 of content of a most recent banking transaction message as a user interface for verifying a banking transaction history and the total amount as a representative item of the bank bundle. Here, the at least a portion 1521 of content of the bank transaction message may include a transaction target, a target bank, a deposit/withdrawal amount, a balance, and the like. In a deposit guide message, a portion of information included in the message may be displayed in a hidden state, and the corresponding content may be provided to be verifiable in response to an input of an additional action, for example, an input of a password, a scratch motion, and the like.

Figure 16:
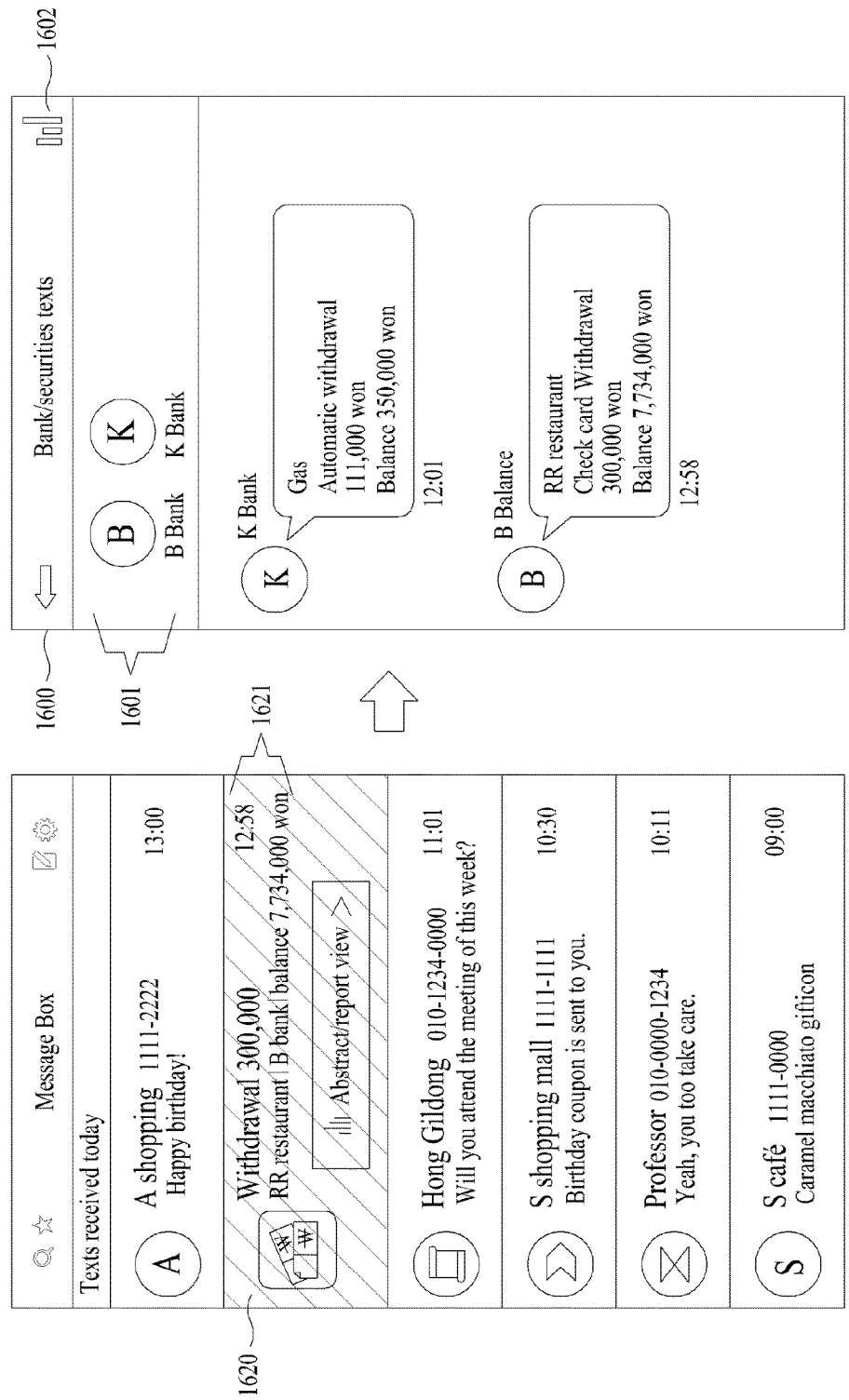

Referring to FIG. 16, in response to the selection of message content 1621 from a bank bundle item 1620 of a message list, a user may connect to a bank bundle detail screen 1600. For example, banking transaction messages may be collected and displayed on the bank bundle detail screen 1600 among messages configured based on a chatroom unit and stored in a message box. Messages classified as bank transaction messages may be sorted based on message reception time and displayed on the bank bundle detail screen 1600. For example, the most recent bank transaction message may be sorted at the lower end of the bank bundle detail screen 1600. In particular, the bank bundle detail screen 1600 may include a bank list 1601 as a configuration capable of classifying and verifying bank transaction messages for each bank and securities company. Here, the bank list 1601 may be configured based on bank information that is matched to an originating number of a bank transaction message or message content parsed from a message. A portion of information included in the bank transaction message may be displayed in a hidden state on the bank bundle detail screen 1600, and the entire content may be provided to be verifiable in response to an additional action, for example, an input of a password, a scratch motion, and the like Although it is described that deposit/withdrawal details are provided for each bank and securities company, it is only an example, and bank transaction messages may be displayed for each account. That is, bank transaction messages may be classified for each account and displayed on the bank bundle detail screen 1600.

The bank bundle detail screen 1600 may include a statement button 1602 as a user interface for accessing a statement that provides transaction details.

In response to the selection of the statement button 1602 on the bank bundle detail screen 1600, a user may connect to a transaction statement screen (not shown). Here, the transaction statement screen may provide banking transaction details monitored and identified through a banking transaction message, and may provide transaction details with respect to all of the banks being used by the user or transaction details for a bank selected by the user.

Although an example of the transaction statement screen is not illustrated, the transaction statement screen may be configured to include a bankbook area for displaying a deposit amount and a withdrawal amount accumulated during an aggregation term and current balance for each bank, a graph area for displaying a monthly deposit amount and withdrawal amount for each bank using a graph, a graph area for displaying a monthly balance for each bank, a comparison-to-previous-month area for displaying results of comparing a monthly deposit amount and withdrawal amount to those of a previous month for each bank, a comparison-to-previous-year area for displaying results of comparing a monthly deposit amount and withdrawal amount for each month to those of the same month of the previous year for each bank, a top area for displaying a preset (or, alternatively, desired) number of, for example, five or ten, recent transactions during an aggregation term, an annual total amount area for displaying a deposit amount and a withdrawal amount accumulated during a year for each bank, and the like.

Figure 17:
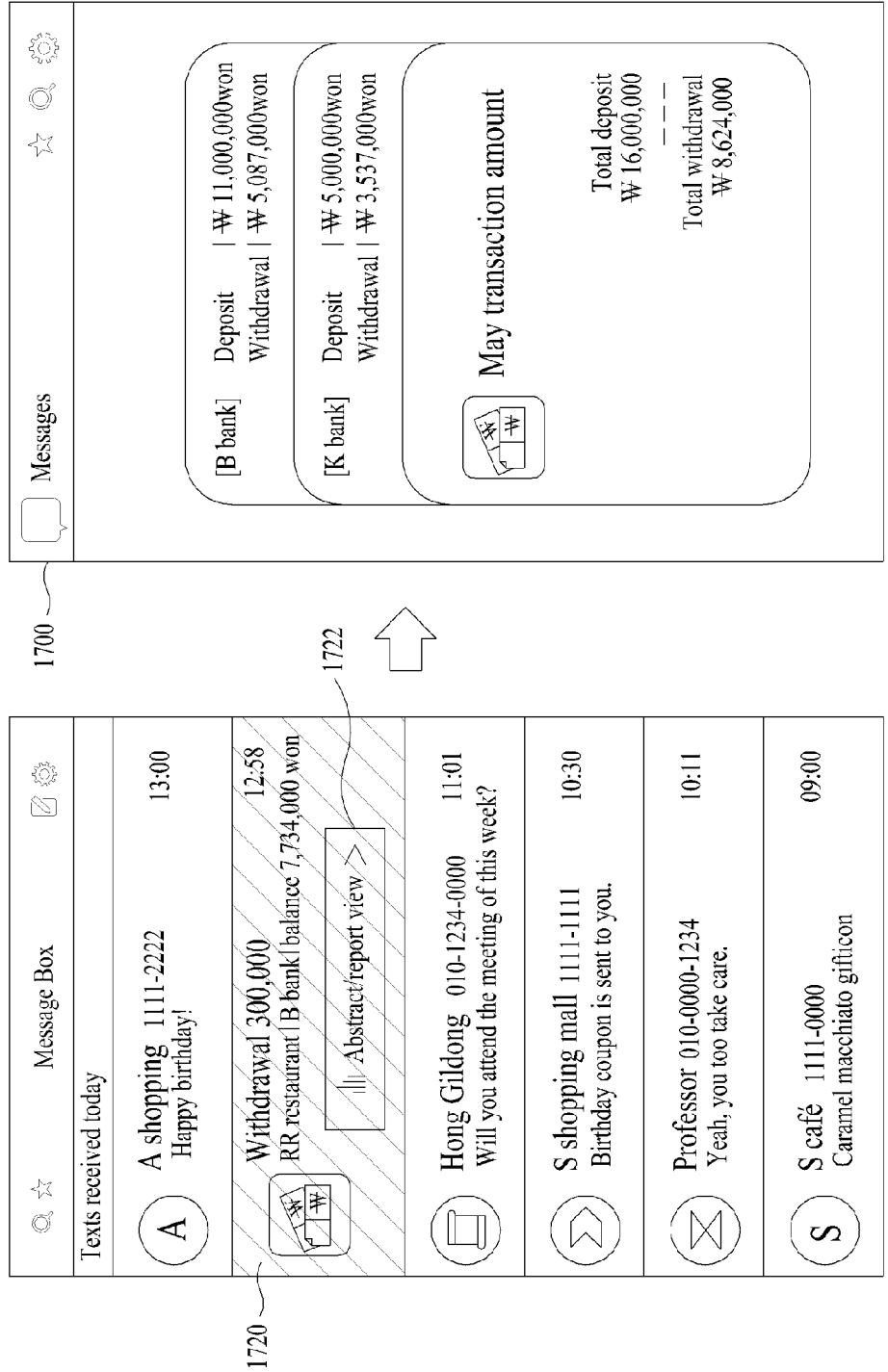

Referring to FIG. 17, in response to the selection of an abstract/report view button 1722 from a bank bundle item 1720 of a message list, a user may connect to a transaction detail screen 1700. For example, a total deposit/withdrawal amount for each bank and an entire total deposit/withdrawal amount may be distinguishably displayed on the transaction detail screen 1700 as bank transaction details of a corresponding month. The transaction detail screen 1700 may include a function of collectively displaying bank transaction messages for each bank, a function of collectively displaying bank transaction messages for each month, a function of displaying comparison results about total deposit/withdrawal amounts for the respective banks, comparison results about total deposit/withdrawal amounts for the respective months, etc.

The transaction detail screen 1700 may provide a bank list monitored and identifiable through a bank transaction message. Here, in response to the selection of a specific bank from the bank list, the user may connect to a bank report screen (not shown) that provides report information associated with the selected bank.

Here, the bank report screen may be configured to provide report information associated with a bank bundle, and may be configured to be similar to the aforementioned bank statement screen. For example, the bank report screen may include a bankbook area for displaying a deposit amount and a withdrawal amount of an individual bank accumulated during an aggregation term and current balance, a graph area for displaying a monthly deposit amount and withdrawal amount of an individual bank using a graph, a graph area for displaying a monthly balance of an individual bank using a graph, a comparison-to-previous month area for displaying results of comparing a monthly deposit amount and withdrawal amount of an individual bank to those of a previous month, a comparison-to-previous-year area for displaying results of comparing a monthly deposit amount and withdrawal amount of an individual bank to those of the same month of a previous year, a top area for displaying a preset (or, alternatively, desired) number of, for example, five or ten, recent transactions during an aggregation term, an annual total amount area for displaying a deposit amount and a withdrawal amount of an individual bank accumulated during a year, and the like.

Similar to the bank statement screen, the bank report screen may also be configured to provide report information about an individual bank and report information about all of the banks.

Figure 18:
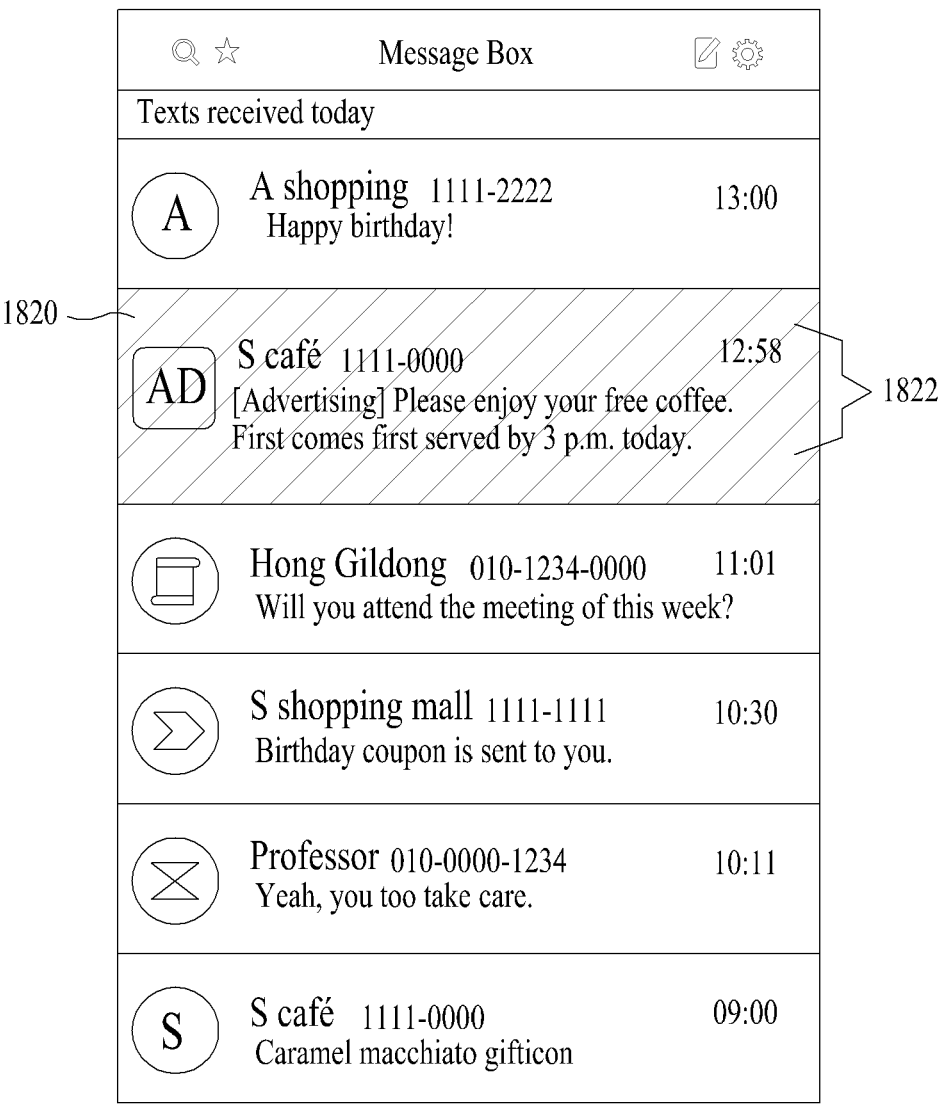

FIG. 18 illustrates an advertising bundle item 1820 ranked in a message list according to at least one example embodiment. An advertising bundle refers to a bundle for verifying and blocking an advertising message. Referring to FIG. 18, the advertising bundle item 1820 may include at least a portion 1822 of content of a most recent advertising message.

As another example, the advertising bundle item 1820 may include a number of unblocked advertising messages and at least a portion of content of a most recent advertising message as a representative item of the advertising bundle.

Figure 19:
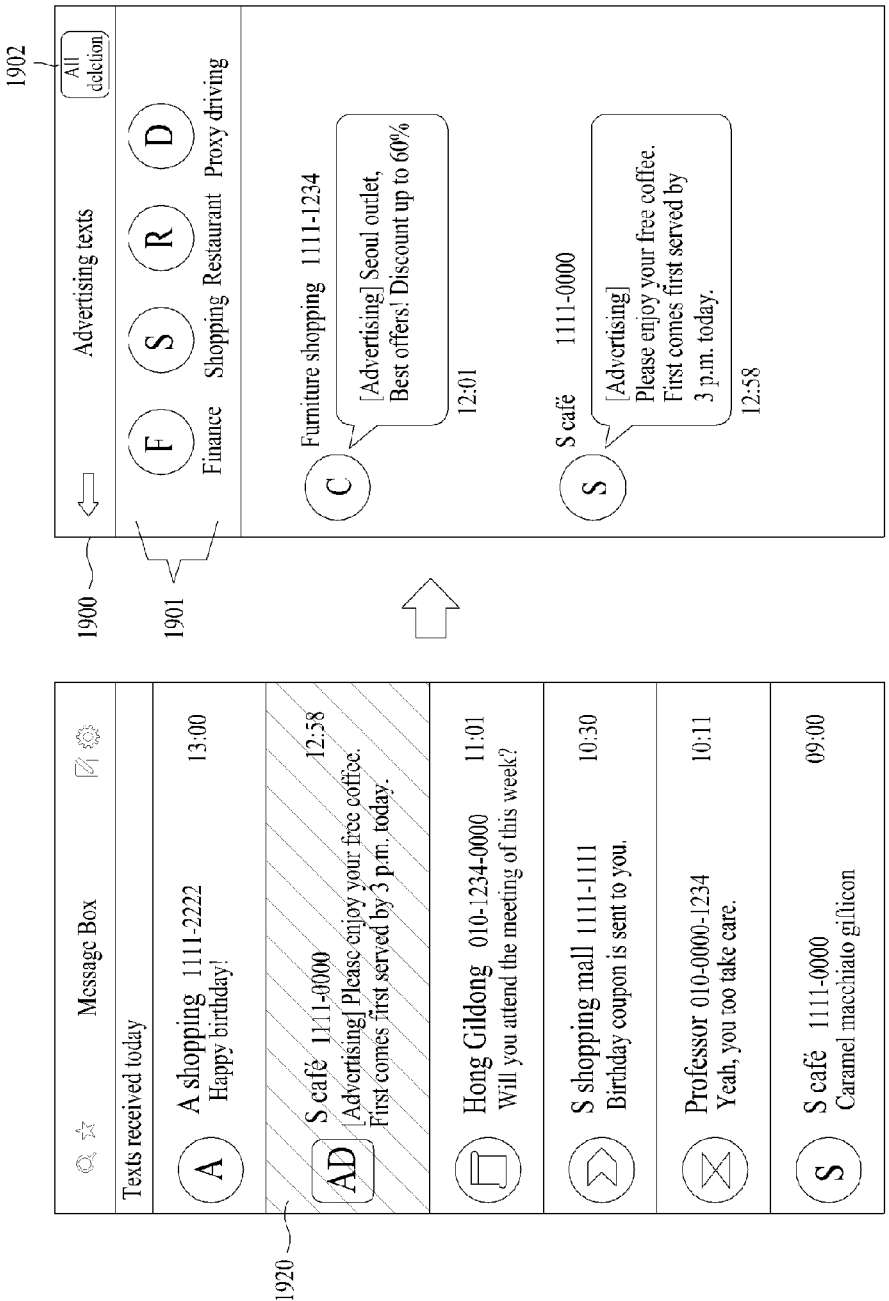

Referring to FIG. 19, in response to the selection of an advertising bundle item 1920 from a message list, a user may connect to an advertising bundle detail screen 1900. For example, advertising messages may be collected and displayed on the advertising bundle detail screen 1900 among messages configured based on a chatroom unit and stored in a message box. Messages classified as advertising messages may be sorted based on a message reception time and displayed on the advertising bundle detail screen 1900. For example, the most recent advertising message may be provided at the lower end of the advertising bundle detail screen 1900.

The advertising bundle detail screen 1900 may include a delete button 1902 that is a user interface capable of blocking or deleting a message included in the advertising bundle as a representative item of the advertising bundle. Here, the delete button 1902 is configured as an advertising block function of moving an advertising message to a separate message box, for example, a blocked mail box, or deleting an advertising message from the message box. The advertising block function indicates a function of selectively blocking a message that includes an advertising phrase in a text of the message regardless of the originating telephone number, which differs from a function of blocking a message based on an originating telephone number of the message. The delete button 1902 may include at least one of a delete-all button for deleting all of messages included in the advertising bundle, a select-and-delete button for selecting and deleting a portion of messages included in the advertising bundle, and a set-and-delete button for setting a message corresponding to a preset criterion, for example, a read message to be automatically deleted If a message marked as important is present among messages requested to be blocked or deleted, it is possible to receive a user intention regarding whether to block or delete the corresponding message through a notification such as a popup and the like.

The advertising bundle detail screen 1900 may include a business type list 1901 as a configuration capable of classifying and thereby verifying an advertising message based on the business type, for example, finance, shopping, restaurant, proxy driving, accommodation, and the like. Here, the business type list 1901 may be configured based on advertising company information that is matched to an originating telephone number of an advertising message or based on message content parsed from the message. In response to the selection of a specific business type from the business type list 1901, an advertising message classified into the selected business type may be displayed on the advertising bundle detail screen 1900.

Further, the advertising bundle may be used to verify a matter of interest of a user for advertising targeting and the like. For example, an advertising block status using an advertising block function or an advertising abandon status in which an adverting message is maintained in a message box may be collected as user information, and the user information may be used as advertising targeting information.

Message content displayed through a representative item of a bundle may be configured by processing a message within the scope of a guide predefined based on a bundle type. For example, a financial company may be classified into a credit card company and a bank based on a type of transaction. Credit cards may be classified into a consumer credit card, a corporate credit card, a check card, etc. Accordingly, a representative item may be configured by processing a received message to be in a format corresponding to the type of transaction. For example, in the case of a consumer credit/corporate credit card, the place of use, the billing amount, the type of payment (single payment/installment), the total amount or limit balance, the credit card name, etc., may be displayed. In the case of a check card, the place of use, the billing amount, the type of payment, the balance (remaining limit), the check card name, etc., may be displayed. In the case of a bank, the type of transaction (deposit/withdrawal/withdrawal cancel), the place of use, the transaction amount, the balance, etc., may be displayed. Further, at least a portion of message content included in a representative item of a bundle may be processed to be highlighted or hidden and thereby displayed. For example, in the case of an authentication related message, an authentication number or an approval number may be processed to be highlighted and thereby displayed. In the case of a card payment message or a banking transaction message, an amount portion may be processed to be hidden and thereby displayed.

The aforementioned message providing method according to the example embodiments may include a reduced number of operations or additional operations based on detailed description of the message providing system described above with reference to FIGS. 1 through 19. Also, two or more operations may be combined and orders or locations of operations may be changed.

Screens of FIGS. 6 through 19 are provided as examples only to help the understanding of the disclosure and convenience of description and a configuration, order, etc., of a screen may be modified.

Figure 20:
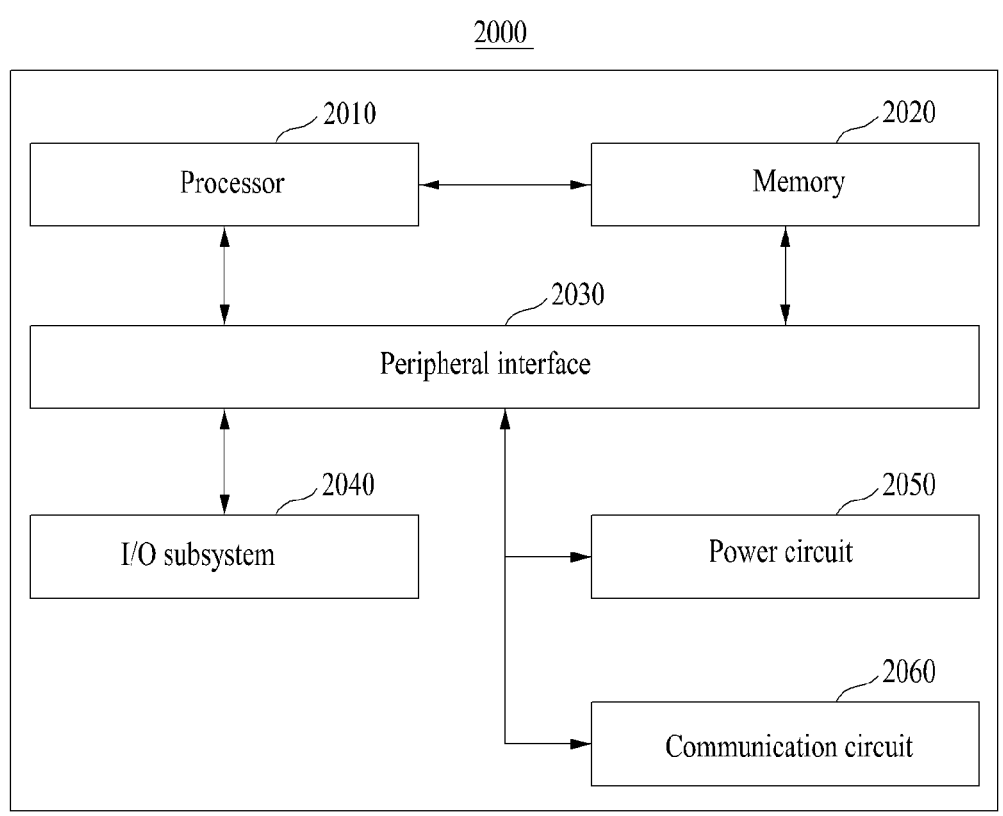
FIG. 20 is a block diagram illustrating an example of a configuration of a computer system according to at least one example embodiment.

FIG. 20 is a block diagram illustrating a configuration of a computer system according to at least one example embodiments. Referring to FIG. 20, a computer system 2000 includes at least one processor 2010, a memory 2020, a peripheral interface 2030, an input/output (I/O) subsystem 2040, a power circuit 2050, and a communication circuit 2060. The computer system 2000 may correspond to the user terminal 101.

The memory 2020 may include, for example, a high-speed random access memory (HSRAM), a magnetic disk, a static random access memory (SRAM), a dynamic RAM (DRAM), read only memory (ROM), a flash memory, and a non-volatile memory. The memory 2020 may include a software module, an instruction set, or a variety of data required for an operation of the computer system 2000. Here, an access from another component such as the processor 2010 and the peripheral interface 2030 to the memory 2020 may be controlled by the processor 2010.

The peripheral interface 2030 may couple an input device and/or an output device of the computer system 2000 with the processor 2010 and the memory 2020. The processor 2010 may perform a variety of functions for the computer system 2000 and process data by executing the software module or the instruction set stored in the memory 2020.

The I/O subsystem 2040 may couple various I/O peripheral devices with the peripheral interface 2030. For example, the I/O subsystem 2040 may include a controller for coupling the peripheral interface 2030 and a peripheral device, such as a monitor, a keyboard, a mouse, a printer, and a touch screen or a sensor depending on a necessity. The I/O peripheral devices may be coupled with the peripheral interface 2030 without using the I/O subsystem 2040.

The power circuit 2050 may supply a power to all of or a portion of components of a terminal. For example, the power circuit 2050 may include a power management system, at least one power source such as a battery and alternating circuit (AC), a charge system, a power failure detection circuit, a power converter or inverter, a power status indicator, or other components for creating, managing and distributing power.

The communication circuit 2060 enables communication with another computer system using at least one external port. Alternatively, as described above, the communication circuit 2060 may enable communication with another computer system by including a radio frequency (RF) circuit and thereby transmitting and receiving an RF signal known as an electromagnetic signal.

The embodiment of FIG. 20 is only an example of the computer system 2000. The computer system 2000 may have a configuration or an arrangement for omitting a portion of the components illustrated in FIG. 20, further including components not illustrated in FIG. 20, or coupling two or more components. For example, a computer system for a communication terminal of a mobile environment may further include a touch screen, a sensor, and the like, in addition to the components of FIG. 20. A circuit for RF communication using a variety of communication methods, for example, wireless fidelity (Wi-Fi), 3rd generation (3G), long term evolution (LTE), Bluetooth, near field communication (NFC), and ZigBee, may be included in the communication circuit 2060. Components includable in the computer system 2000 may be configured as hardware that includes an integrated circuit specified for at least one signal processing or application, software, or a combination of hardware and software.

As described above, according to some example embodiments, it is possible to further effectively configure a message list by providing messages grouped based on message content, and to enhance the message management quality by managing messages based on a group unit. Also, according to some example embodiments, it is possible to apply a characteristic of an individual group and to provide a message through an efficient group management environment by grouping messages included in a group using an item capable of representing the group and by providing the grouped messages.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method implemented in a computer for providing text messages in a text message box of a user terminal for receiving the text messages sent through a communication network, the method comprising:
    classifying, by a processor, a plurality of text messages received at the user terminal into a predefined group based on message content parsed from the received text messages without the received text messages being indicated to be classified into the predefined group by senders of the plurality of text messages, the plurality of text messages including at least two text messages sent to the user terminal from at least two separate senders;
    creating, by the processor, a representative item of the predefined group using a select text message included in the predefined group; and
    providing, by a processor, message items through a message list displayed in the text message box that includes the representative item as an item associated with the predefined group and a plurality of individual text messages received at the user terminal and not included in the predefined group,
    wherein the plurality of text messages classified into the predefined group are provided in the message list as a bundle item, the bundle item being ranked in the message list, and
    wherein the representative item of the group is displayed in the bundle item.

2. The method of claim 1, wherein the classifying comprises determining the predefined group corresponding to the received text messages among a plurality of predefined groups based on message content parsed from the received text messages.

3. The method of claim 2, wherein the plurality of predefined groups includes at least one of a group for managing authentication related messages, a group for managing delivery related messages, a group for managing card payment messages, a group for managing banking transaction messages, a group for managing smishing messages, and a group for managing advertising messages.

4. The method of claim 1, wherein the creating comprises creating the representative item Using at least one of an undeleted text message, an unread text message, and a text message received during a unit period, among text messages included in each group, and a user interface for providing accumulated information or statistical information associated with text messages of each group.

5. The method of claim 1, wherein, in a case the predefined group is a group for managing an authentication related message, the creating comprises creating the representative item using at least one of an undeleted text message and an unread text message among text messages included in the group.

6. The method of claim 1, wherein, in a case the predefined group is a group for managing a delivery related message, the creating comprises creating the representative item using a text message received during a unit period among text messages included in the group.

7. The method of claim 1, wherein, in the case the predefined group is a group for managing a financial transaction related message, the creating comprises creating the representative item using a user interface for providing accumulated information or statistical information associated with text messages of the group.

8. The method of claim 1, wherein, in a case the predefined group is a group for managing an authentication related message, the providing comprises providing at least one of a function of deleting all of text messages included in the group in response to a selection of the group from the message list, a function of selecting and deleting at least a portion of the text messages included in the group, a function of automatically deleting a text message that satisfies a desired condition among the text messages included in the group.

9. The method of claim 1, wherein, in a case the predefined group is a group for managing a delivery related message, the providing comprises providing a function of providing a delivery shipment history and a delivery tracking status referred with an originating telephone number of a message included in the group in response to a selection of the group from the message list.

10. The method of claim 1, wherein, in a case the predefined group is a group for managing a financial transaction related message, the providing comprises providing at least one of a function of providing statistical information about transactions of all of financial companies and a function of providing statistical information about transactions of individual financial companies.

11. The method of claim 1, wherein, in a case the predefined group is a group for managing an advertising message, the providing comprises providing at least one of a function of blocking or deleting all of messages included in the group in response to a selection of the group from the message list and a function of selecting at least a portion of the text messages included in the group and blocking or deleting the selected text messages.

12. The method of claim 1, wherein the providing comprises processing at least a portion of information displayed through the representative item to be hidden or to be highlighted.

13. A non-transitory computer-readable recording medium storing a computer program for providing text messages in a text message box of a user terminal for receiving the text messages sent through a communication network, the program when executed by a computer causing the computer to perform functions comprising:
classifying a plurality of text messages received at the user terminal into a predefined group based on message content parsed from the received text messages without the received text messages being indicated to be classified into the predefined group by senders of the plurality of text messages, the plurality of text messages including at least two text messages sent to the user terminal from at least two separate senders;
creating a representative item of the group using a select message included in the group; and
providing message items through a message list displayed in the text message box that includes the representative item as an item associated with the group and a plurality of individual text messages received at the user terminal and not included in the predefined group,
wherein the plurality of text messages classified into the predefined group are provided in the message list as a bundle item, the bundle item being ranked in the message list, and
wherein the representative item of the group is displayed in the bundle item.

14. A message providing system for providing text messages in a text message box of a user terminal for receiving the text messages sent through a communication network comprising:
a memory for storing at least one program;
a processor including a plurality of functional units configured to perform a plurality of corresponding functions enabled by the at least one program stored in the memory, wherein the functional units include,
a classifier configured to classify a a-plurality of text messages received at the user terminal into a predefined group based on message content parsed from the received text messages without the received text messages being indicated to be classified into the predefined group by senders of the plurality of text messages, the plurality of text messages including at least two text messages sent to the user terminal from at least two separate senders;
a creator configured to create a representative item of the group using a select text message included in the group; and
a provider configured to provide message items through a message list displayed the text message box that includes the representative item as an item associated with the predefined group and a plurality of individual text messages received at the user terminal and not included in the predefined group,
wherein the plurality of text messages classified into the predefined group are provided in the message list as a bundle item, the bundle item being ranked in the message list, and
wherein the representative item of the group is displayed in the bundle item.

15. The message providing system of claim 14, wherein the classifier is configured to determine the predefined group corresponding to the received text messages from among a plurality of predefined groups based on message content parsed from the received text messages.

16. The message providing system of claim 14, wherein the creator creates the representative item using at least one of an undeleted text message, an unread text message, and a text message received during a unit period, among text messages included in each group, and a user interface for providing accumulated information or statistical information associated with text messages of each group.

17. The message providing system of claim 14, wherein, in a case the predefined group is a group for managing an authentication related message, the creator creates the representative item using at least one of an undeleted text message and an unread text message among text messages included in the group.

18. The message providing system of claim 14, wherein, in a case the predefined group is a group for managing a delivery related message, the creator creates the representative item using a text message received during a unit period among text messages included in the group.

19. The message providing system of claim 14, wherein, in a case the predefined group is a group for managing a financial transaction related message, the creator creates the representative item using a user interface for providing accumulated information or statistical information associated with text messages of the group.

\* \* \* \* \*